(12) United States Patent
Best-Devereux

(10) Patent No.: US 7,565,302 B2
(45) Date of Patent: Jul. 21, 2009

(54) NEGOTIATING REINSURANCE FOR A RISK

(75) Inventor: Igor Best-Devereux, Salt Lake City, UT (US)

(73) Assignee: Ereinsure.Com, Inc., Salt Lake City, UT (US)

( * ) Notice: Subject to any disclaimer, the term of this patent is extended or adjusted under 35 U.S.C. 154(b) by 0 days.

(21) Appl. No.: 11/939,411

(22) Filed: Nov. 13, 2007

(65) Prior Publication Data

US 2008/0065556 A1     Mar. 13, 2008

Related U.S. Application Data

(63) Continuation of application No. 10/029,464, filed on Dec. 20, 2001, now Pat. No. 7,333,940.

(60) Provisional application No. 60/257,500, filed on Dec. 21, 2000, provisional application No. 60/324,784, filed on Sep. 25, 2001.

(51) Int. Cl.
*G06Q 40/00* (2006.01)
(52) U.S. Cl. .................. 705/4; 705/35; 705/37
(58) Field of Classification Search ............ 705/4, 705/35, 37
See application file for complete search history.

(56) References Cited

U.S. PATENT DOCUMENTS

| | | | |
|---|---|---|---|
| 4,831,526 A | 5/1989 | Luchs et al. | |
| 5,168,446 A | 12/1992 | Wiseman | |
| 5,253,165 A | 10/1993 | Leiseca et al. | |
| 5,305,200 A | 4/1994 | Hartheimer et al. | |
| 5,495,412 A | 2/1996 | Thiessen | |
| 5,523,942 A | 6/1996 | Tyler et al. | |
| 5,704,045 A | 12/1997 | King et al. | |
| 5,794,210 A | 8/1998 | Goldhaber et al. | |
| 5,794,212 A | 8/1998 | Mistr, Jr. | |
| 5,806,042 A | 9/1998 | Kelly et al. | |
| 5,873,066 A | 2/1999 | Underwood et al. | |
| 5,924,082 A | 7/1999 | Silverman et al. | |
| 5,956,687 A | 9/1999 | Wamsley et al. | |
| 5,956,691 A | 9/1999 | Powers | |
| 5,963,923 A | 10/1999 | Garber | |
| 5,970,479 A | 10/1999 | Shepherd | |
| 5,991,740 A | 11/1999 | Messer | |
| 6,049,773 A | 4/2000 | McCormack et al. | |
| 6,055,519 A | 4/2000 | Kennedy et al. | |

(Continued)

OTHER PUBLICATIONS

Instant low cost satellite reinsurance., M2 Presswire, Nov. 8, 2000.*

(Continued)

*Primary Examiner*—Gerald J. O'Connor
*Assistant Examiner*—R. D. Rines
(74) *Attorney, Agent, or Firm*—Workman Nydegger

(57) ABSTRACT

System, methods, and computer program products for facilitating negotiations for reinsurance of a risk. The negotiations for reinsurance of a risk are conducted between a cedent and one to many assumers. An interface is provided for allowing submissions of risk for reinsurance, responses from selected assumers, and replies to the responses as necessary to continue or conclude the negotiation. The interface also allows users to view information exchanged during various stages of the negotiation. Additional functionality including categorizing risk, categorizing reinsurance, required distribution, distribution preferences, and endorsement agreements are also provided.

24 Claims, 8 Drawing Sheets

U.S. PATENT DOCUMENTS

| | | | |
|---|---|---|---|
| 6,058,379 | A | 5/2000 | Odom et al. |
| 6,061,665 | A | 5/2000 | Bahreman |
| 6,064,981 | A | 5/2000 | Barni et al. |
| 6,067,528 | A | 5/2000 | Breed et al. |
| 6,067,531 | A | 5/2000 | Hoyt et al. |
| 6,112,189 | A | 8/2000 | Rickard et al. |
| 6,119,093 | A | 9/2000 | Walker et al. |
| 6,594,635 | B1 * | 7/2003 | Erlanger .................. 705/4 |
| 7,080,020 | B1 * | 7/2006 | Klaus ...................... 705/4 |
| 7,099,840 | B1 | 8/2006 | Sullivan |
| 7,333,940 | B2 | 2/2008 | Best-Devereux |
| 7,461,007 | B2 * | 12/2008 | Lundegren ............... 705/4 |
| 2002/0029158 | A1 | 3/2002 | Wolff et al. |
| 2002/0032646 | A1 * | 3/2002 | Sweeney et al. ........ 705/38 |
| 2002/0046067 | A1 * | 4/2002 | Kraehenbuehl et al. ... 705/4 |
| 2002/0116228 | A1 | 8/2002 | Bauer et al. |
| 2002/0143584 | A1 * | 10/2002 | Lundegren ............... 705/4 |
| 2002/0152098 | A1 * | 10/2002 | Evans et al. ............. 705/4 |

OTHER PUBLICATIONS

Chubb to Use eReinsure's Internet Platform For Placement of U.S. Facultative Reinsurance., Business Wire, May 8, 2002, p. 2302.*

Instant low cost satellite reinsurance., M2 Presswire, Nov. 8, 2000.

Chubb to Use eReinsure's Internet Platform For Placement of U.S. Facultative Reinsurance., Business Wire, May 8, 2002, p. 2302.

Kerridge et al., "Virtual Tendering and Bidding in the Construction Sector," Electronic Commerce and Web Technologies, First International Conference, EC-Web 2000, London, United Kingdom, Sep. 4-6, 2000, Proceedings pp. 379-388.

Maxwell, "Web Re," Canadian Insurance, vol. 105, No. 8, Jul. 2000, pp. 16-19.

Connolly, "Reinsurers See B2B Web Opportunities," National Underwriter, vol. 104, No. 17, Apr. 24, 2000, pp. 8, 11.

Barbuceanu et al., "A Multi-Attribute Utility Theoretic Negotiation Architecture for Electronic Commerce," Proceedings of the Fourth International Conference on Autonomous Agents, Barcelona, Catalonia, Spain, Jun. 3-7, 2000, pp. 239-246.

Pitt et al., "Protocols and Intentional Specifications of Multi-Party Agent Conversations for Brokerage and Auctions," Proceedings of the Fouth International Conference on Autonomous Agents, Barcelona, Catalonia, Spain, Jun. 3-7, 2000, pp. 269-275.

Ouimette, "Making a Market," Best's Review, vol. 100, No. 12, Apr. 2000, pp. 148-150.

MacSweeney, "Reinsurance Goes Virtual at General Life," Insurance and Technology, vol. 24, No. 13, Dec. 1999, p. 19.

Jonker et al., "A Multi-agent Architecture for an Intelligent Website in Insurance," Cooperative Information Agents III, Third International Workshop, CIA '99, Uppsala Sweden, Jul. 31-Aug. 2, 1999, Proceedings, pp. 86-100.

Benn et al., "Enabling Interactive Negotiations by Adaptive Software Agents," Cooperative Information Agents III, Third International Workshop, CIA '99, Uppsala Sweden, Jul. 31-Aug. 2, 1999, Proceedings, pp. 337-346.

Goveia, "Re-Commerce," Canadian Insurance, vol. 104, No. 8, Jul. 1999, pp. 20-23.

Gjersten, "Exploring New Distribution Systems," National Underwriter (Property & Casualty/Risk & Benefits Management), vol. 102, No. 48, Nov. 30, 1998, pp. 15-16.

Mullen et al., "The Auction Manager: Market Middleware for Large-Scale Electronic Commerce," Third USENIX Workshop on Electronic Commerce Proceedings, Boston, Massachusetts, Aug. 31-Sep. 3, 1998, pp. 34-47.

Kumar et al., "Internet Auctions," Third USENIX Workshop on Electronic Commerce Proceedings, Boston, Massachusetts, Aug. 31-Sep. 3, 1998, pp. 49-60.

Schwartz, "Build a Network And They Will Come," Insurance and Technology, vol. 23, No. 9, Sep. 1998, p. 10.

Scwartz, "Virtually Amazing!," Insurance and Technology, vol. 23, No. 9, Sep. 1998, pp. 21-23.

Sandholm, "Agents in Electronic Commerce: Component Technologies for Automated Negotiation and Coalition Formation," Cooperative Information Agents II, Learning, Mobility and Electronic Commerce for Information Discovery on the Internet, Second International Workshop, CIA'98, Paris, France, Jul. 4-7, 1998, Proceedings, pp. 113-134.

Tauhert, "Web-Based System Allows Risk Hedge," Insurance and Technology, vol. 23, No. 3, Mar. 1998, p. 28. cited by other.

Chavez et al., "Challenger: A Multi-agent System for Distributed Resource Allocation," Proceedings of the First International Conference on Autonomous Agents, Marina del Ray, California, Feb. 5-8, 1997, pp. 323-331.

Bahreman et al, "Payment Method and Negotiation Service Framework and Programming Specification," Proceedings of the Second USENIX Workshop on Electronic Commerce, Nov. 18-21, 1996, Oakland, California, pp. 299-314.

Eriksson et al., "Information and Interaction in MarketSpace—towards an open agent-based market infrastructure," Proceedings of the Second USENIX Workshop on Electronic Commerce, Nov. 18-21, 1996, Oakland, California, pp. 271-277.

About CATEX, http://info.catex.com, date unknown.

* cited by examiner

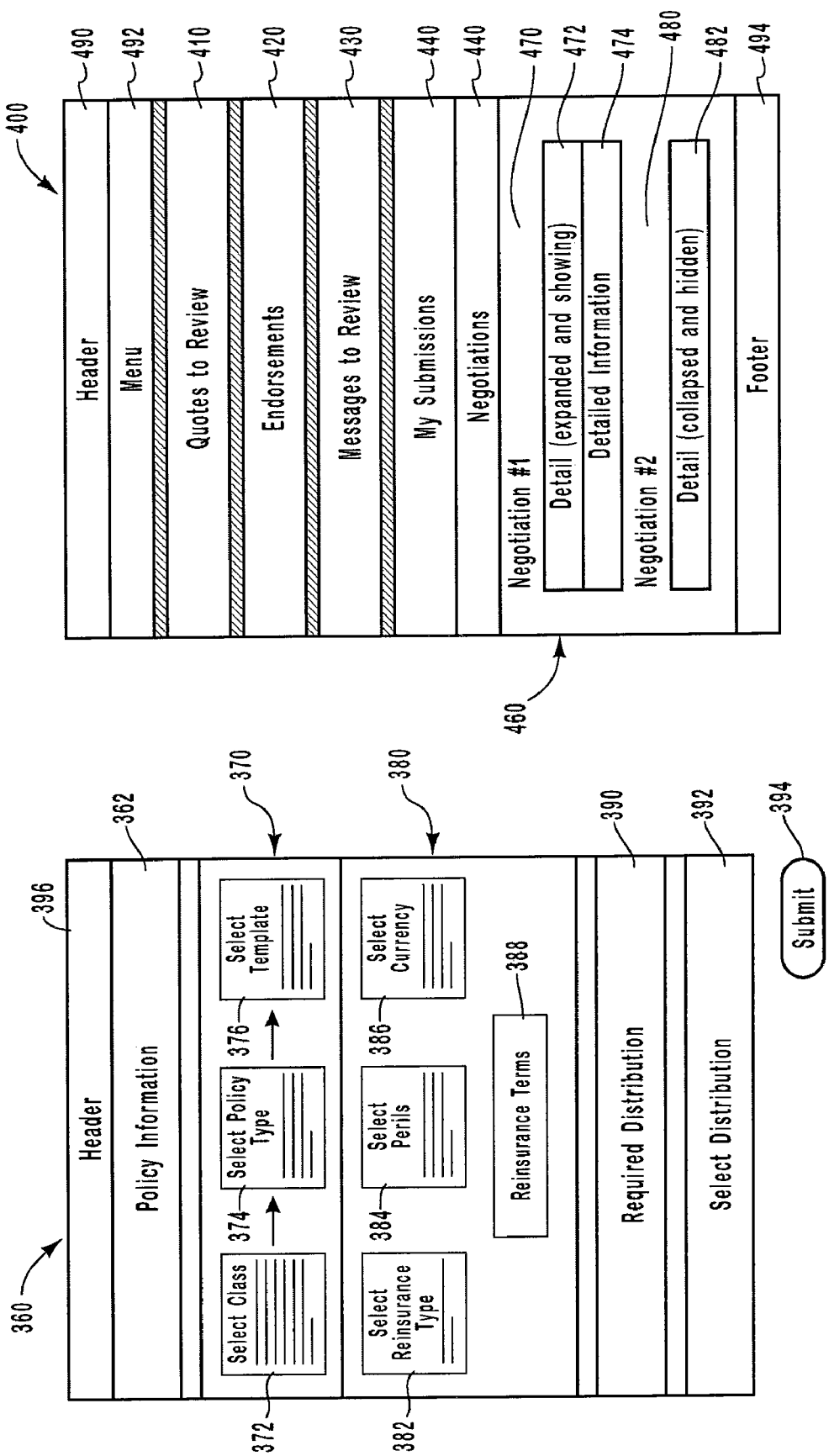

NEGOTIATING REINSURANCE FOR A RISK

CROSS-REFERENCE TO RELATED APPLICATIONS

This application is a continuation of U.S. patent application Ser. No. 10/029,464, filed Dec. 20, 2001, now U.S. Pat. No. 7,333,940 entitled "Systems and Methods for Negotiating Reinsurance for a Risk", which claims the benefit and priority of both U.S. Provisional Application No. 60/257,500, filed Dec. 21, 2000, entitled "Systems and Methods for Binding a Risk", as well as U.S. Provisional Application No. 60/324,784, filed Sep. 25, 2001, entitled "Method and System for Binding a Risk." The present application also claims the benefit and priority of the foregoing provisional applications, which are both incorporated herein by reference.

BACKGROUND OF THE INVENTION

1. The Field of the Invention

The present invention relates to negotiating and binding reinsurance of insurance risks. More particularly, the present invention relates to systems, methods, and computer program products for facilitating the negotiation of reinsurance for insurance risks.

2. Background and Related Art

The process of transferring a risk from one insurance company to another is referred to as reinsurance. An insurance underwriter or another representative of an insurance company who holds a risk is called a cedent. An intermediary for an insurance company who acquires reinsurance of risks for insurance companies is called a broker. In a reinsurance negotiation a cedent or broker provides information to a reinsurance company, underwriter employed by a reinsurance company, or a broker representing the reinsurance company. The reinsurance company or underwriter is called an assumer. The assumer will typically review the information and may discuss it with the cedent or broker to further assess the magnitude of the risk.

The parties will negotiate terms under which the assumer will be prepared to assume all or a portion of the risk in exchange for a premium. During the reinsurance negotiation, the parties will use analysis of the risk and relevant experience in the field to determine the terms of the reinsurance. The exchange of negotiation information can be facilitated by many methods including email, fax transmission, courier package, postal service, by hand, telephone, or video-conference. Various forms might be used to collect the information in a structured format and to indicate typical questions used to facilitate analysis of the potential risk. The information can be presented in many forms including diagrams, presentations, financial information, contracts, summaries, descriptions, photographs, and/or conversations. Negotiations can be conducted during an abbreviated or extended time period and can involve multiple parties in close or distant geographic proximity to one another.

Due to differences with which different cedents, brokers, and assumers organize and present reinsurance and risk information, there is a lack of conformity in the way negotiations are handled. This leads to negotiation information that is unstructured and difficult to efficiently access and review. Because those involved in the negotiation and placement of reinsurance risks use substantially varied business practices, the lack of uniformity of risk information, reinsurance information, and negotiation information can make accessing and managing the information difficult.

There is an ever present need for reinsurance as a means of spreading risk across insurance and reinsurance companies and for allowing reinsurance products to be made available in a form that cedents and assumers find useful. Accordingly there is a need for facilitating the sharing of information between a cedent, a broker, and an assumer; negotiating terms and conditions for the reinsurance; managing of information; and binding and subsequently endorsing policies for reinsurance.

SUMMARY OF THE INVENTION

The present invention allows users to conduct reinsurance negotiations, view the stages of the negotiation and the information exchanged during the stages of the negotiation, and facilitate the negotiations between cedents, brokers, and assumers. A cedent or broker makes a submission of a risk for reinsurance to one or more assumers or brokers of reinsurance risk. The submission includes a classification and description of the risk, the type of reinsurance requested, and a distribution preferences list. The distribution preferences list can include both assumers and brokers to whom the submission should be conveyed and assumers and brokers to whom the submission can be, but is not required to be, conveyed. Even though the distribution preferences list is used in creating or generating the submission, the distribution preferences list is not typically submitted to the assumers and brokers included in the distribution preferences list.

Each assumer or broker that receives a submission from a cedent can provide a response to that submission in accordance with the present invention. Exemplary responses include, but are not limited to, an offer, a counteroffer, a quote, a plurality of alternative quotes, a request for additional information, a refusal to quote, a refusal of a counteroffer, or an acceptance to bind the risk.

The cedent or broker then replies to the response(s) received from the assumer(s) or broker(s). Exemplary replies include, but are not limited to, a resubmission of the risk for reinsurance, an acceptance of a quote, a submission of additional information, a request to bind a risk, a counteroffer, a refusal of a quote, or an offer. The cedent/broker and one or more assumers continue with responses and replies as necessary to continue or complete the negotiation.

During the negotiation, the submission, responses, and replies are monitored and stored on a host server and/or by the cedent, broker, or assumer. An interface for the cedents, assumers, and brokers allows them to respectively input submissions, responses, and replies and to view previous submission, responses, and replies and the associated information exchanged during each stage of the negotiation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to systems, methods, and computer program products for facilitating the negotiation of reinsurance for insurance risks. The embodiments of the present invention may comprise a special purpose or general-purpose computer including various computer hardware, as discussed in greater detail below.

Figure 1:
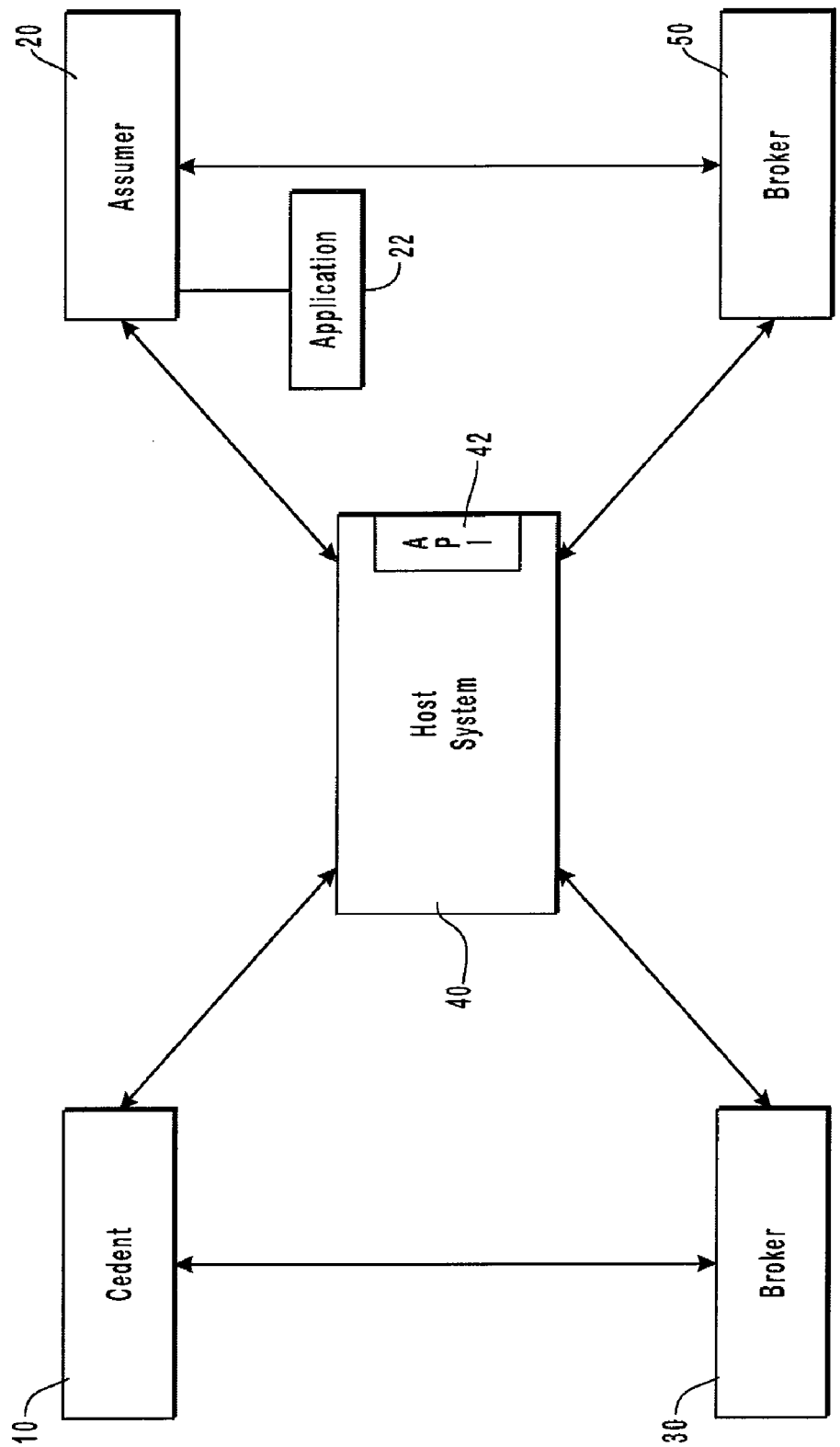
FIG. 1 illustrates an exemplary system that includes a cedent, an assumer, a host system, and optional brokers.

With reference now to FIG. 1, there is shown an exemplary system in which a negotiation for reinsurance is conducted. The illustrated system includes a cedent 10, assumers 20, optional brokers 30 and 50, and a host system 40. The cedent 10 is often an insurance underwriter or another representative of an insurance company who holds a risk. The risk is typically a policy or other embodiment of insurance for a risk that the insurance company or other entity has assumed. The cedent 10 negotiates directly or indirectly, through one or more brokers, with the assumer 20 for reinsurance of the risk.

The assumers 20 are, for example, a reinsurance company or underwriter who assumes insurance risk. The assumers 20 will engage directly or indirectly with the cedent 10 in negotiations for the reinsurance. The brokers 30 and 50 are optional parties to reinsurance negotiations who represent either the cedent 10 or the assumer 20 in the reinsurance negotiation. While the brokers 30 and 50 can be an optional party to reinsurance negotiations, for the sake of simplicity negotiations will be discussed primarily with reference to cedents 10 and assumers 20. It is understood that negotiations between cedents 10 and assumers 20 can optionally be conducted through one or more broker intermediaries 30 and/or 50.

In the present invention the host system 40 receives and conveys information exchanged as part of the negotiation. The host system 40 thus can monitor information exchanged during various stages of the reinsurance negotiation. By utilizing a host system 40, the present invention enables the users to view information exchanged at various stages of the negotiation and facilitates the negotiation by allowing the users to provide responses and replies to continue or conclude the negotiation. The cedent, broker, and assumers can convey information to the host system 40 over a network system such as an intranet, Internet, world wide web, or other network system. The host system 40 includes an interface for the cedent 10, assumers 20, and the brokers 30 and 50 such that the negotiations can be accessed and information input as part of a submission, response, or reply. The interface and the associated information can be accessed from one or more client systems using standard Internet protocols, for example. The information can be input utilizing templates associated with the host system's interface.

In the illustrated embodiment, an application programming interface (API) 42 is also included in the host system 40. The API 42 allows information contained in, for example, an extensible markup language (xml) message to be automatically input in the host system in a desired format. By utilizing the API 42 and xml technology (or other compatible technology that facilitates data transfer between an application and the host system), policy, underwriter, and reinsurance information can be input into the system without manual input of the same information by a user into templates of the user interface. In other words, the API allows an application to interface with the host system 40 . . . . In this example, the API 42 is accessible to an application 22 that is associated with the assumer 20. Any application of the assumer 20 can use the API 42 to access the host system. In a similar manner, cedents and brokers also have access to an API that permit their applications to access the host system. In one example, this permits a cedent or an assumer to more easily share reinsurance data with other systems. For example, an assumer may use the API to retrieve reinsurance data that is provided to an accounting system of the assumer.

Figure 2:
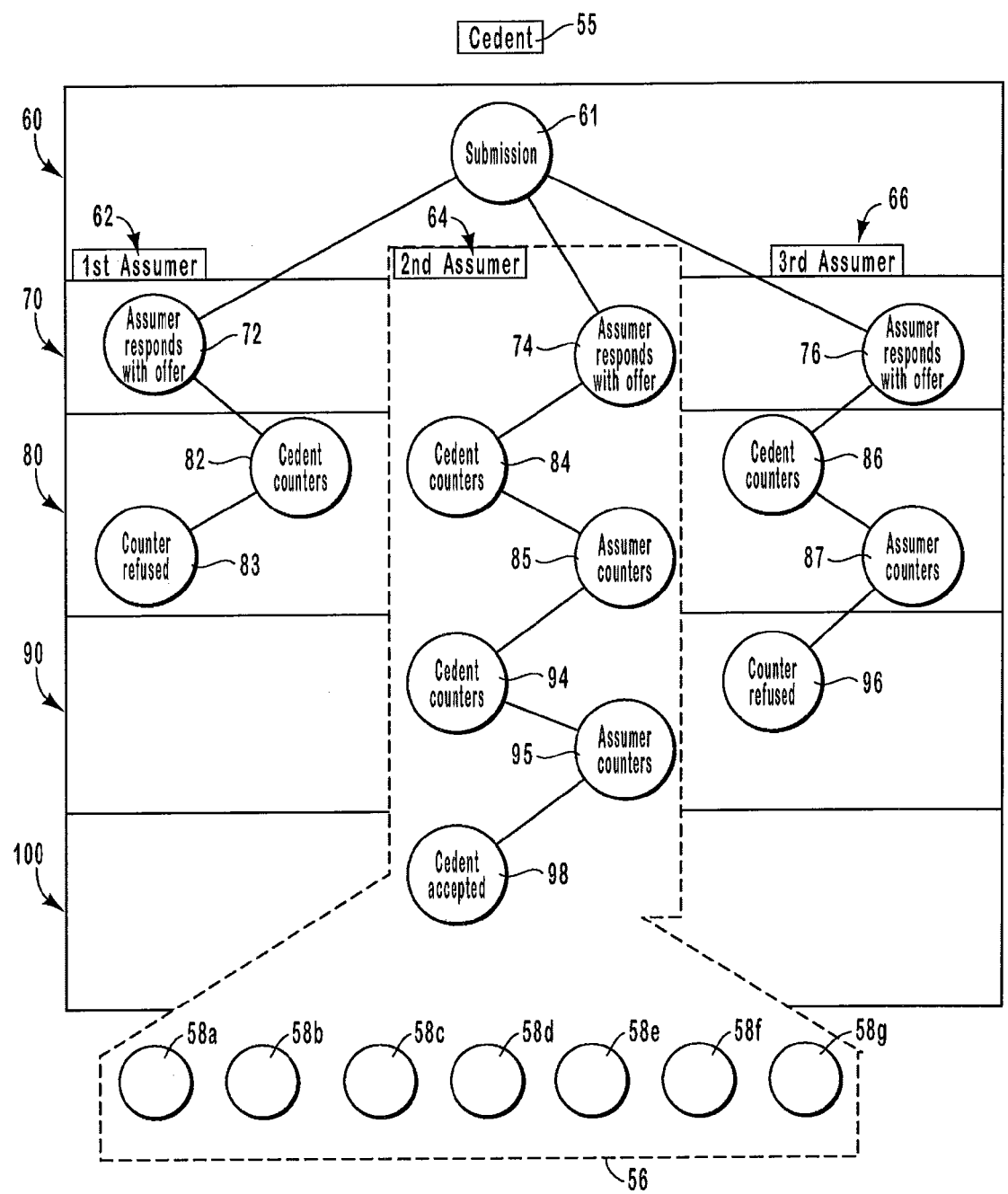
FIG. 2 is a schematic diagram of a negotiation for the reinsurance of a risk.

With reference to FIG. 2, the information included in a submission is initially collected in a series of templates displayed within, for example, an Internet browser or an API as discussed with reference to FIG. 1. The collected information allows the user to describe the origin of the risk. The risk may be, for example, a physical property or some risk arising from an activity or legal requirement, or in some other form such as a person's life. The submission also describes the risk in terms of a class of insurance and a form of contract that has been provided by an insurance or reinsurance company.

In the embodiment utilizing templates, information is also input regarding the type of reinsurance being sought as a means of transferring some or all of this risk from an insurance company to a reinsurance company. In this embodiment, certain information is described as "unstructured information" and some is described as "structured data". In most cases the "unstructured information" is input into fields within the templates that allow text including more than several hundred characters to be input while "structured data" is input into fields that are formatted to receive numerical input or which are labeled in such a way as to specifically describe the nature of the information that will be input.

In this embodiment the initial information collection that creates a set of information referred to as the risk record or submission is completed in four steps. In this example the steps have been chosen to help the user input policy, underwriting, and reinsurance information into templates that are reasonably sized relative to the size of a computer screen that might typically be used by the person inputting information and data. Policy information includes, but is not limited to, the holder of the policy, the issuer of the policy, the terms of the policy, the effective date of the policy, and exclusions. Underwriting information includes, but is not limited to, value of the policy, the value being insured, the address of the insured risk, past claims experience, and other relevant risk related information. The reinsurance information includes, but is not limited to, proposed terms of the reinsurance, whether reinsurance follows the fortunes of the original insurance, whether reinsurance covers only a subset of the coverage provided by the original insurance, period of the reinsurance, the amount to be reinsured, the rates for the reinsurance, and any other reinsurance related information. The data input to the templates is recorded in a database where it is held in tables where a relationship exists between the fields used for input and specific tables within the database. At any time during the process of inputting information, the user may cause the information to be saved as a draft record. In addition to providing templates for input there are also steps in this embodiment that display the names and other details of companies or individuals to whom notification might be sent regarding the location of the risk record. This selection is made by the user from a list of companies or individuals and a summary is provided allowing the user to check the selection before notifications are sent.

In addition to information being input to certain templates during the creation of the submission, a user can attach files of various types that will also be saved in the database and associated with specific parts of the risk record. In one embodiment, an attachment is enabled by a user clicking a button displayed on an html page and indicating that it is for the purpose of attaching a file or fax. In the event that a file is selected as the preferred attachment, a new page appears and allows the user to select an electronic file from some directory on either their local or network source. Once such a file has been selected, the user can provide a description of the file and the file name and that description will be displayed on the data input or submission. If a fax attachment is preferred, the user will be presented with a page containing a unique reference that can be printed and faxed together with additional pages of information. These pages will be received by a fax service and attached to the appropriate risk record as an image file based on the unique reference generated for the fax cover sheet. These attachments will be viewable by the parties to whom the risk record is submitted as well as by the originator.

One aspect of the present invention is the use of notification in addition to notification through information displayed on a unique "home page" available to each user on the host system. One exemplary embodiment of notification, is that an email is created by the present invention according to specific rules and is sent to the email address of the selected user (cedent, broker, or assumer). A URL (Universal Resource Locator) is included within the body of the email and enables the user to securely link to the present invention using a connection to the Internet and view current information regarding the risk that is the subject of the request for reinsurance.

An important aspect of the present invention is that a user who is representing an insurance company can chose to submit a request for reinsurance to one or more assumers or brokers. Each assumer or other intermediary will be able to view the risk record originally submitted but their responses will create unique threads of negotiation as described below.

According to the present invention, a user may view summary information regarding the requests for reinsurance that they have originated or received. The cedent and assumer or broker homepage, stored by the host system, include information collected into several groups helping the user to understand the status of each transaction and enabling the user to link to more detailed information as necessary. These pages are drawn by the application in such a way that the information displayed is that most recently saved to the database relating to records or submissions that have either been originated by or notified to the user. Changes that have occurred since the last viewing of the information may be displayed in a different color or identified in another way.

With further reference now to FIG. 2 there is shown a schematic diagram of a negotiation for reinsurance of a risk between a cedent or broker and at least one assumer. In the negotiation, a cedent 55 negotiates with a first assumer 62, a second assumer 64, and a third assumer 66. FIG. 2 further illustrates that the cedent can negotiate with each assumer independently of the other assumers that receive the submission from the cedent. Each assumer may be unaware both of whether the cedent is negotiating with other assumers and of the details of the negotiations with those assumers.

In the first stage of negotiations 60 the cedent 55 makes a submission of a risk for reinsurance 61 to the first assumer 62, the second assumer 64, and the third assumer 66. The submission for the reinsurance of the risk comprises policy information relating to the initial insurance of the risk provided by the cedent and of information relating to the type of reinsurance being sought. By submitting the policy information and reinsurance information, assumers identify the risk for which reinsurance is sought and the type of reinsurance perils the cedent wishes to have assumed. From the submission the assumers determine whether they are interested in entering negotiations for the reinsurance of the risk submitted by the cedent.

In the second stage of negotiations 70, the assumers provide responses to the submission. The first assumer 62 responds with an offer 72. Similarly, the second assumer 64 responds with an offer 74. The third assumer 66 also responds with an offer 76. While the schematic illustrates the responses from the first assumer 62, the second assumer 64, and the third assumer 66 as being offers, the responses are neither uniform nor limited to offers. Other potential responses include, but are not limited to, quotes, a plurality of alternative quotes, requests for additional information, refusals to quote, or acceptances of a request to bind.

In the third stage of the negotiations 80, the cedent 55 provides a reply to each of the offers received from the assumers. The cedent 55 replies with a counteroffer 82 to the first assumer 62. Similarly, the cedent 55 replies with a counteroffer 84 to the second assumer 64. The cedent 55 also replies with a counteroffer 86 to the third assumer. The potential replies to the responses from the assumers are not limited to counteroffers. The replies can also include, but are not limited to, resubmission of the risk for reinsurance, an acceptance of a quote, additional information, a request to bind a risk, a counteroffer, a refusal of a quote, or an offer.

The assumers 62, 64, and 66 provide responses to the counteroffers 82, 84, and 86 from the cedent 55. The response from the first assumer 62 is a refusal of the counteroffer 83. In the negotiation, the refusal of the counteroffer 83 results in a termination of the negotiation with the first assumer 62. While the refusal of the counteroffer 83 results in a termination of the negotiation, this will not always be the case. The cedent 55 can resubmit the risk for reconsideration by the assumer. The assumer can then determine whether to re-enter negotiations for reinsurance of the risk.

The response from the second assumer 64 is a counteroffer 85. The response from the third assumer 66 is also a counteroffer 87. The responses from the assumers are not limited to counteroffers or refusal of the counteroffers. The responses can also include, but are not limited to, new offers, requotes, a plurality of alternative quotes, and requests for additional information.

In the fourth stage of negotiations 90 the cedent 55 replies only to the counteroffers of the second assumer 64 and the third assumer 66. The reply of the cedent 55 to the second assumer is a counteroffer 94. The reply of the cedent 55 to the third assumer is a refusal of the counteroffer 96. The refusal of the counteroffer 96 results in a termination of the negotiation with the third assumer 66. While the refusal of the counteroffer 96 results in a termination of the negotiation with the third assumer 66, this will not always be the case. Upon receiving a refusal of the counteroffer, the assumer can respond with a new offer, or requote to the cedent 55. The cedent can then determine whether to re-enter or resume negotiations for reinsurance of the risk with the assumer.

In the concluding stage of negotiations 100 the cedent 55 provides a reply to the counteroffer 95 of the second assumer 64. The reply of the cedent 55 is an acceptance of the counteroffer 98. The reply of the cedent in the concluding stage of the negotiation is not limited to acceptance of the counteroffer. The potential replies can also include, but are not limited to, an acceptance of a quote, a request to bind the risk, a counteroffer, or a refusal of a quote. In the illustrated embodiment, acceptance of the counteroffer is sufficient to conclude the negotiation. In an alternative embodiment of the present invention once there is an acceptance of the terms the cedent must additionally make a request to bind the risk. The assumer must then accept the request to bind. The acceptance of the request to bind results in a final agreement for reinsurance of a risk.

As will be understood by those skilled in the art, the schematic of FIG. 2 is intended to illustrate the basic concepts of negotiation of a reinsurance risk and is in no way intended to limit the scope or spirit of the present invention. For example, while FIG. 2 illustrates three separate negotiations conducted with three assumers, any number of negotiations with any number of assumers can be conducted within the scope of the present invention. Additionally, while there are illustrated five negotiations stages, any number of stages could be conducted to finalize the negotiation. An agreement can also be reached with any number of assumers.

FIG. 2 also illustrates a market of assumers of reinsurance risk 56. The market of potential assumers of reinsurance risk 56 is illustrated as comprising assumers 58a-g. In one embodiment of the invention, once there is acceptance of the terms between the second assumer 64 and the cedent 55, the assumer can present the risk to the market 56. Each of the assumers 58a-g can accept a portion of the risk subject to the terms of the agreement between the cedent 55 and the assumer 64.

Figure 3:
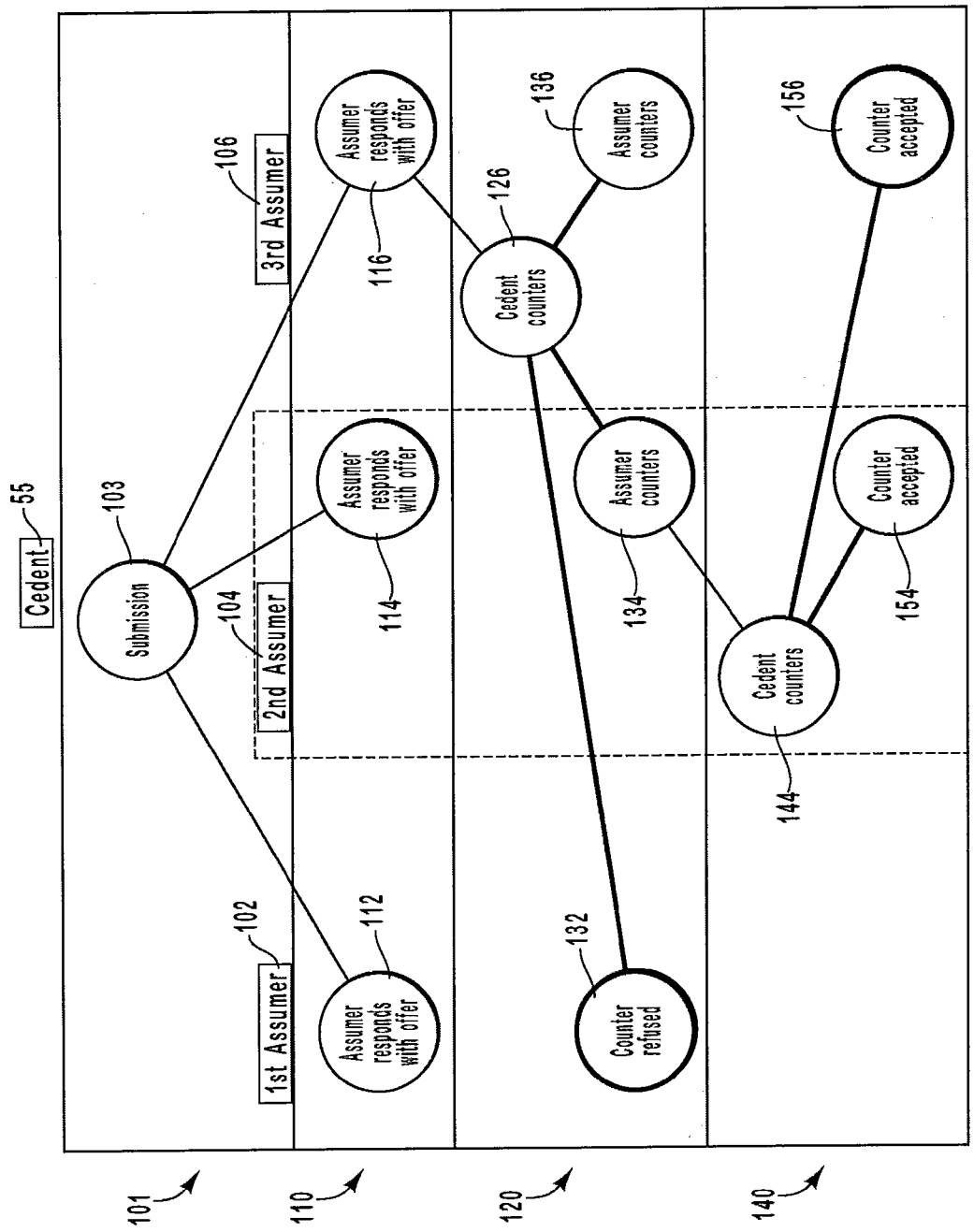
FIG. 3 is a schematic diagram of alternative example of negotiating reinsurance of a risk.

With reference now to FIG. 3 there is shown a schematic diagram of an alternative method of negotiating reinsurance of a risk. In the illustrated embodiment the cedent 55 negotiates cooperatively with a first assumer 102, a second assumer 104, and a third assumer 106 to achieve consensus by syndication.

In the first stage of negotiations 101 the insurer makes a submission of a risk for reinsurance 103 to a first assumer 102, a second assumer 104, and a third assumer 106. In one embodiment of the present invention, the assumers 102, 104, and 106 are cognizant of each assumer to whom the submission is made. In an alternative embodiment, the submission is conveyed to the assumers 102, 104, and 106 without the assumers being aware of one another.

In the second stage of the negotiation 110, the assumers 102, 104, and 106 provide a response to the submission 103 of the cedent 55. The response of the first assumer 102 is an offer 112 to the cedent 55. Similarly, the response of the second assumer 104 is an offer 114 to the cedent 55. The response of the third assumer 106 is also an offer 116 to the cedent 55. As was discussed with respect to FIG. 2, the potential responses to a submission by the cedent 55 are not limited to offers. A plurality of different types and combinations of responses from the assumers are possible.

In the third stage of the negotiation 120, the cedent 55 makes a reply to the first assumer 102, the second assumer 104, and the third assumer 106. The reply is a counteroffer 126 based on the offer 116 of the third assumer 106. In using a syndication model as illustrated in FIG. 3, one response becomes the basis for the reply given to all assumers. The response that is closest to the terms desired by the cedent 55 is used to formulate a standard reply that is then made to all assumers continuing to participate in the negotiation.

Based on the cedent's counteroffer 126 the assumers provide a response to the cedent 55. The response of the first assumer 102 is a refusal of the counteroffer 132. The refusal of the counteroffer 132 terminates the negotiation with the first assumer 102. The response of the second assumer 104 is a counteroffer 134. Similarly, the response of the third assumer 106 is a counteroffer 136. As discussed with reference to FIG. 2, there can be a plurality of types and combinations of responses to the counteroffer in the negotiation of reinsurance of a risk.

In the fourth and concluding stage of the negotiation 140 the cedent 55 makes a reply to the second assumer 104 and the third assumer 106. The reply of the cedent 55 is a counteroffer 144 based on the counteroffer 134 of the second assumer. As discussed with reference to FIG. 2, the type of reply of the cedent 55 is not limited to a counteroffer and could include a variety of types of replies. Once the reply has been received, the second assumer 104 and the third assumer 106 provide a response to the cedent's counteroffer 144. The response of the second assumer 104 is an acceptance of the counteroffer 154. The response of the third assumer 106 is also an acceptance of the counteroffer 156. Multiple acceptances of the counteroffer can be dealt with in different ways. The cedent 55 can decide to submit a request to bind only to one assumer. Alternatively, the cedent 55 can request that one or more assumers assume a portion of the risk. Alternatively, the cedent 55 can use the acceptance as the basis for further negotiation with both assumers.

Figure 4:
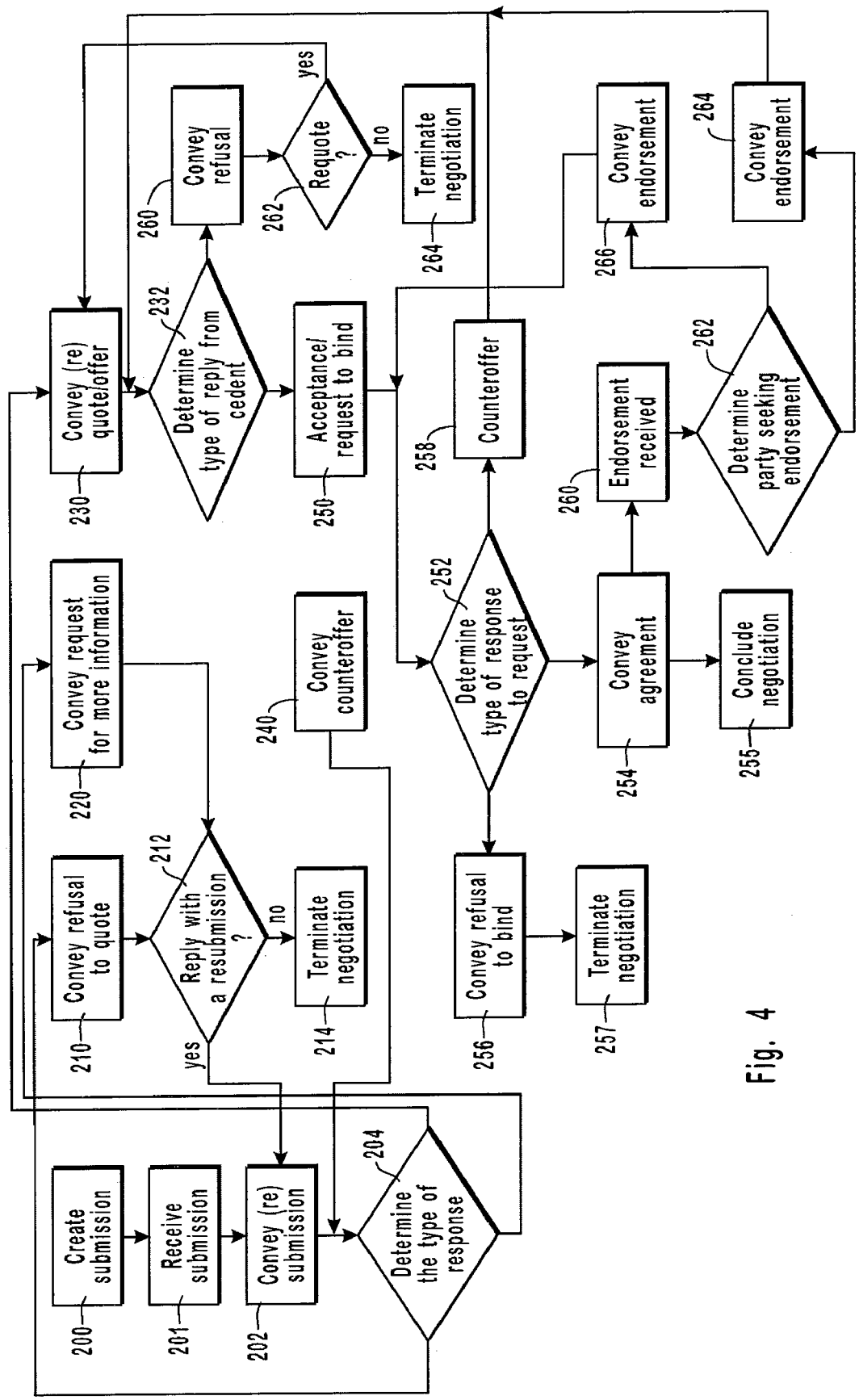
FIG. 4 is a block diagram illustrating the logic of a negotiation for reinsurance of a risk.

With reference now to FIG. 4 there is shown a block diagram illustrating the logic of a negotiation for reinsurance of a risk. In the method, a cedent creates a submission of a risk for reinsurance in step 200. The submission of the risk for reinsurance is received in step 201. After the submission is received, the submission is conveyed to the one or more assumers of reinsurance risk in step 202. Once the submission of the risk has been conveyed, a determination of a response type received from an assumer is conducted in step 204. If the response is a refusal to quote, the refusal to quote is conveyed to the cedent in step 210. After conveying the refusal to quote, the determination of whether a resubmission has been received from the cedent is made in step 212. If a resubmission has been received, the resubmission is conveyed to one or more assumers in step 202. If no resubmission has been received, the negotiation is terminated in step 214.

Returning to the determination of response type conducted in step 204, if the response is a request for more information, the request for more information is conveyed to the cedent in step 220. Once the request for more information is received, the determination of whether a resubmission has been received is conducted in step 212. If a resubmission has been received, the resubmission is conveyed to one or more assumers in step 202. If no resubmission has been received, the negotiation is terminated in step 214.

Again returning to the determination of response type conducted in step 204, if the response is an offer/quote, the offer/quote is conveyed to the cedent in step 230. Once the offer/quote has been conveyed to the user, a determination of the type of reply received from the cedent is conducted in step 232. In the logic diagram of the FIG. 4, the response type received from the cedent can be a counteroffer, a refusal of the quote/offer, or an acceptance/ request to bind. The response types are not limited to counteroffers, quotes/offers, or acceptances/requests to bind in the present invention. However, to clearly illustrate the logic of reinsurance negotiations these response types are sufficient to demonstrate the steps of reinsurance negotiations. It will be understood that additional response types are possible without departing from the scope or spirit of the present invention.

In the event that the reply from the cedent is a counteroffer, the counteroffer is conveyed to the assumer in step 240. Once the counteroffer is conveyed to the assumer, the method returns to a determination of the response types received from the assumer in step 204 and the subsequent steps in the method.

In the event that the reply from the cedent is a refusal of the quote/offer, the refusal of the quote/offer is conveyed to the assumer in step 260. Once the refusal quote/offer has been conveyed to the assumer, the determination of whether a response comprising a requote has been received from the assumer is conducted in step 262. In the event that a requote/reoffer has been received the requote/reoffer is conveyed to the cedent in step 230.

In the event that the reply from the cedent is an acceptance/request to bind, the acceptance/request to bind is conveyed to the assumer in step 250. Once the acceptance/request to bind is conveyed to the assumer, a determination of the response type received from the assumer is executed in step 252. In the logic diagram of the FIG. 4, the reply from the cedent can be a refusal to bind, an agreement, or a counteroffer. The reply types are not limited to a refusal to bind, an agreement, or a counteroffer. However, to clearly illustrate the logic of reinsurance negotiations these reply types are sufficient to demonstrate the steps of reinsurance negotiations. It will be understood that additional reply types are possible without departing from the scope or spirit of the present invention.

If the reply type is a refusal to bind, the refusal to bind is conveyed to the cedent in step 256. Once the refusal to bind is conveyed to the cedent, the negotiation is terminated in step 257. In an alternative embodiment of the present invention, the refusal to bind does not necessarily result in a termination of the negotiation. In the alternative embodiment, the cedent can provide a resubmission in an effort to continue the negotiation with the assumer.

If the response type is a counteroffer, the counteroffer is conveyed to the cedent in step 258. Once the counteroffer has been conveyed to the cedent, the method returns to the step of determining the reply type received from the cedent in step 232.

If the response is an agreement, the agreement is conveyed to the cedent in step 254. The agreement can be embodied in a variety of forms including a summary of the agreement, a binder, a certificate, or a policy. Additionally, the agreement may be formalized by the parties using a variety of methods including, but not limited to, digital signatures from one or all parties, multiple independent digital signatures iteratively appended to the document from each party, one or more actual signatures from a copy of the agreement which is printed and subsequently signed, or any combination of the above. Once an agreement has been reached and the formalizations have been conveyed to the parties, the negotiation can be concluded in step 255.

An agreement and conveyance of the formalizations does not necessarily conclude the negotiation. Once an agreement has been reached and the formalizations have been conveyed to the parties, an endorsement/request for an alteration of the terms agreed upon by the parties during the negotiation can be received in step 260. Once an endorsement/request is received, a determination of whether the assumer or cedent sent the endorsement is conducted in step 262. If the assumer created the endorsement, the endorsement/request is conveyed to the cedent in step 264. Once the endorsement/request has been conveyed to the cedent, the method returns to the step of determining the reply type received from cedent in step 232. If the cedent created the endorsement, the endorsement/request is conveyed to the assumer in step 266. Once the endorsement/request has been conveyed to the cedent, the method returns to the step of determining the response type received from the assumer in step 252.

The logic diagram illustrated in FIG. 4 illustrates how a negotiation for the reinsurance of a risk is conducted. By allowing the cedent and assumer to iteratively submit responses, replies, resubmissions, and endorsements, the present invention provides flexibility in conducting the reinsurance negotiation. By monitoring the submissions, responses, and replies exchanged during stages of the negotiation, the present invention allows users to access information related to the present stage of the negotiation as well as information relating to other stages of the negotiation. Providing an interactive interface to access the information as well as input submissions, responses, and replies greatly facilitates the negotiation of reinsurance risks in a network architecture.

Figure 5:
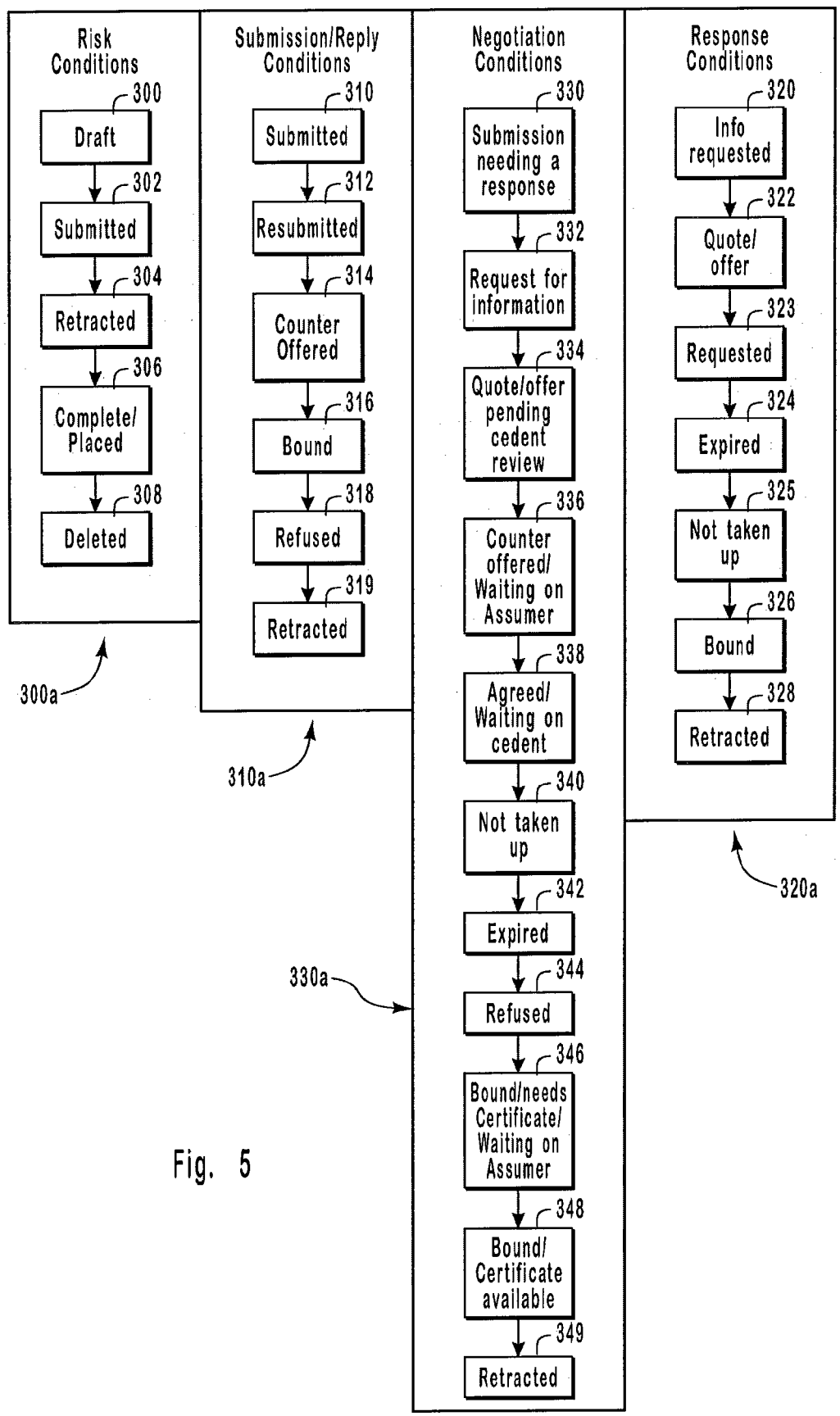
FIG. 5 illustrates various conditions associated with a negotiation for reinsurance of a risk.

With reference now to FIG. 5 there is shown various conditions associated with a negotiation for reinsurance of a risk. The conditions are divided into risk conditions 300a, submission/reply conditions 310a, response conditions 320a, and negotiation conditions 330a. Risk conditions 300a illustrate the state of the risk for which reinsurance is being sought before, during, and after the reinsurance negotiation. Submission/reply conditions 310a illustrate various states associated with cedent actions conducted during and after the negotiation of reinsurance. Response conditions 320a illustrate various states associated with assumer actions conducted during and after the negotiation of reinsurance. The negotiation related conditions 330a identify various states of the reinsurance negotiation pending additional action of the cedent or the assumer during the negotiation for reinsurance of a risk.

Risk conditions 300a illustrate the state of the risk for which reinsurance is being sought. Risk conditions comprise a drafted submission 300, a submitted risk 302, a retracted submission 304, a completed/placed submission 306, and a deleted submission 304. A drafted submission 300 is a risk for which a drafted submission has been completed. A submitted risk 302 is a risk that has been submitted for reinsurance. A retracted submission 304 is a risk that has been temporarily retracted from consideration for reinsurance. A completed/placed submission 306 is a risk for reinsurance has been acquired and the risk has been bound. A deleted submission 308 is a risk that has permanently been deleted from consideration for reinsurance 308.

Submission/reply conditions 310a illustrate various states associated with cedent actions conducted during and after the negotiation of remsurance. Submission/reply conditions compuse a submitted condition 310, a resubmitted condition 312, a counteroffer condition 314, a bound condition 316, a refused condition 318, and a retracted condition 319. The submitted condition 310 is a submission/reply condition when a risk has been submitted for reinsurance. The resubmitted condition 312 is a submission/reply condition when a risk has been resubmitted after an initial submission of the risk. The counteroffer condition 314 is a submission/reply condition when a cedent makes a counteroffer to an assumer's offer, quote, or counteroffer. The bound condition 316 is a submission/reply condition when a risk is bound subsequent to a negotiation for reinsurance of a risk. The refused condition 318 is a submission/reply condition when a risk is refused by an assumer for consideration for reinsurance. The retracted condition 319 is a submission/reply condition when a risk is retracted by a cedent for reinsurance consideration.

Response conditions 320a illustrate various states associated with assumer actions conducted during and after the negotiation of reinsurance. The response conditions comprise an information requested condition 320, a quote/offer condition 322, a requote condition 323, an expired condition 324, a not taken up condition 325, a bound condition 326, and a retracted condition 328. The information requested condition 320 is a response condition when additional risk related information has been requested by the assumer. The quote/offer condition 322 is a response condition when a quote/offer has been given for the assumption of a risk. The requote condition 323 is a response condition when a requote is given subsequent to an earlier quote for assumption of a risk. The expired condition 324 is a response condition when a time contingency placed on a quote or offer has expired. The not taken up condition 325 is a response condition when a quote or offer given by an assumer is not taken up by a cedent. The bound condition 326 is a response condition for a quote or offer that has resulted in the binding of a risk. The retracted condition 328 is a response condition for a quote or offer that is retracted subsequently to being given.

The negotiation related conditions 330a identify various states of the reinsurance negotiation pending additional action by the cedent or the assumer during the negotiation for reinsurance of a risk. The negotiated related conditions comprise a submission needing a response condition 330, a request for information condition 332, a quote/offer pending review of a cedent condition 334, a counteroffer pending review of an assumer condition 336, an agreement pending review of cedent condition 338, a not taken up condition 340, an expired condition 342, a refused condition 344, a bound waiting for certificate condition 346, a bound certificate provided condition 348, and a retracted condition 349.

The submission needing a response condition 330 is a negotiation condition where a submission for reinsurance has been received but no response to the submission has been received. The request for information condition 332 is a negotiation condition where a request for additional information has been received for a posted submission. The quote/offer pending review of a cedent condition 334 is a negotiation condition where a quote/offer is pending review by the cedent. The counteroffer pending review of an assumer condition 336 is a negotiation condition where a counteroffer has been received but no response to the counteroffer has been received from the assumer. The agreement pending review of cedent condition 338 is a negotiation condition where an agreement between the parties has been reached but the cedent has not submitted a request to bind the risk. The not taken up condition 340 is a negotiation condition where an agreement between the parties has been reached but the cedent has not, and will not, request that the risk be bound. The expired condition 342 is a negotiation condition where a time contingent given with quote, submission, or offer has expired. The refused condition 344 is a negotiation condition where a quote, offer, counteroffer, or requote from the assumer or cedent has received a reply or a response of refusal of the quote, offer, counteroffer, or requote. The bound waiting for certificate condition 346 is a negotiation condition where a risk is bound and the cedent is waiting for a certificate from the assumer. The bound certificate provided condition 348 is a negotiation condition where the risk has been bound and the certificate has been provided by the assumer. The retracted condition 349 is a negotiation condition where a quote, offer, or requote has been retracted from consideration subsequent to being given to a cedent.

A direct relationship exists between the risk conditions, submission/reply conditions, negotiation conditions, and response conditions illustrated in FIG. 5. There are many ways to arrive at any given condition. To understand the ways in which different conditions are reached FIGS. 2, 3, and 4 and the associated explanation of reinsurance negotiations can be utilized. It will also be appreciated that the described conditions are included for illustrative purposes and should not be considered to limit the scope of the present invention. Any type, number, and combination of conditions can be utilized without departing from the spirit of the present invention.

Figure 6:
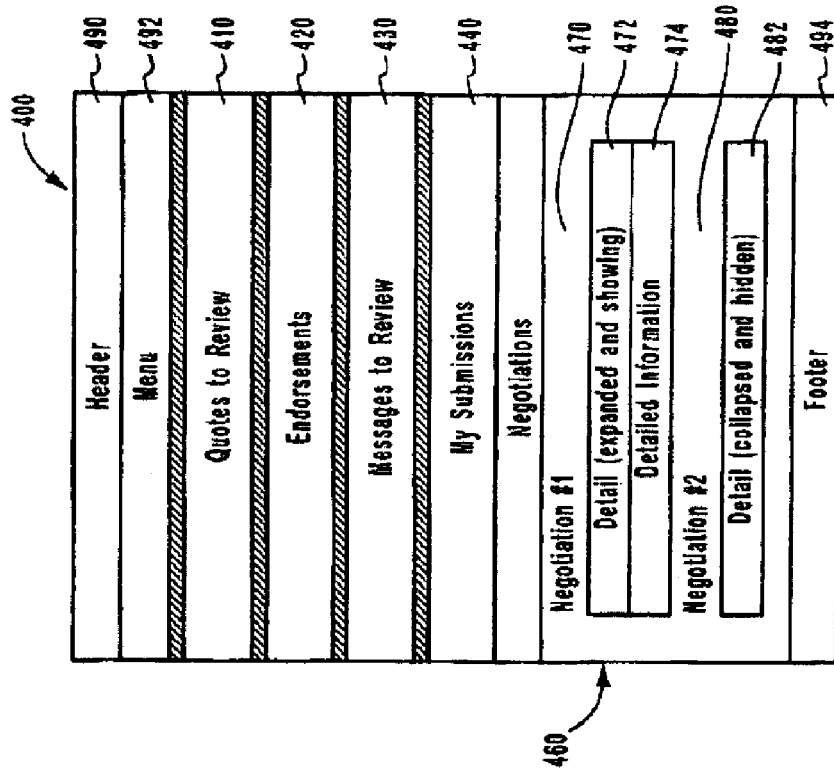
FIG. 6 illustrates a submission interface for making a submission of a risk for reinsurance.

With reference now to FIG. 6, there is shown a submission interface 360 of the present invention. The submission interface 360 allows a user to prepare and post a submission of a risk for reinsurance. The user can be a cedent or a broker who acts as an intermediary between a cedent and an assumer. The submission interface is comprised of fields for inputting risk related information and reinsurance related information. The fields for inputting risk related information include fields 362, 364, and 370. The fields for inputting reinsurance related information include fields 380, 390, and 392. There is also shown a submit button 394 and a submission header 396. The submit button 394 allows a cedent to submit a completed submission to one or more assumers. The submission header 396 provides interactive access to submission administrative information such as submission date, submission number, or any other information to assist the users or system in processing the submission.

The fields for inputting risk related information comprise an Insurance policy information field 362 and a policy classification field 370. The insurance policy information field 362 allows the user to input information related to an insurance policy issued by the cedent to an insured. Policy information is useful in the context of reinsurance negotiations due to the fact that the risk to be reinsured is typically an insurance policy issued by the cedent to an insured.

The policy classification field 370 allows users of various levels of sophistication and experience to efficiently and correctly input policy related information in a manner that allows assumers to review information in an organized fashion. The policy classification field 370 comprises a class selector list 372, a policy type selector list 374, and a template selector list 376. The class selector list 372 provides a listing of policy classifications. By viewing the list 372 the user is able to identify and select the appropriate class of policy from a superset of policy classifications. The policy type selector list 374 provides a subset of policy types within the policy class selected by the user in association with the class selector button 374. By viewing policy type list 374 the user is able to select a policy type from the subset of policy types.

Once a policy class and type has been identified, the user can select a prepared template using the template selector list 376. The template selector list 376 provides a variety of templates that are configured to allow entry of policy and risk information typically associated with the policy class and type. For example, if the user is seeking reinsurance of home flood policy risks, the user will first view the class selector list 372. The user will then be presented with class of risk that can include commercial, personal, home, auto. The user will then select the home classification. The user will then view the policy type selector list 374 which will present the user with a subset of home type risks that can include, homeowners, flood, theft, liability, or umbrella. The user will select flood policy type. The user will then view the template selector list 376 which presents the user with several templates specially configured to allow users to input information typically associated with home flood policies. By inputting the information into the template, the user can provide all the necessary risk information related to the policy.

The fields for inputting reinsurance related information comprise a reinsurance classification and request field 380, a required distribution field 390, and a distribution preferences field 392. The reinsurance classification and request field 380 allows the users of varying degrees of experience and sophistication to input information needed to identify the type of desired reinsurance and the proposed terms for the reinsurance in an organized and efficient manner. The reinsurance classification and request field 380 comprises a reinsurance selector button 382, a perils selector button 384, and a currency selector button 386, and a proposed terms field 388. The reinsurance selector button 382 is an interactive link allows the user to identify and select a type of reinsurance. By clicking on the button 382 the user is presented with reinsurance types associated with the policy type previously selected. The user can then identify and select the reinsurance type desired.

The perils selector button 384 is an interactive link that allows users to identify and select the perils associated with the risk for which they are seeking reinsurance. By clicking on the perils selector button 384 the user is presented with a list of perils typically associated with the type of reinsurance previously selected. The user can identify and select the perils for which they are seeking reinsurance or whether the reinsurance will be following form. The perils selector button 384 may also be configured to present the user with a custom information window for inputting additional perils not listed. The currency selector button 386 allows users to input the type of currency in which the risk is to be insured. This allows users to insure risks from various regions of the world in the appropriate currency for the area. The proposed terms field 388 allows the cedent to select the proposed terms for the reinsurance. The proposed terms include the risks to be covered, the amount of reinsurance, the reinsurance rates, and other applicable terms of reinsurance.

The required distribution field 390 allows the cedent and/or the broker to identify assumers to whom the submission must be conveyed. This allows the cedent and/or the broker and unprecedented level of control over distribution of submission information. For example, if a cedent is working with a broker, by using the required distribution field 390 the cedent is assured that certain assumers will receive the submission of a risk. Accordingly, the cedent is assured that the broker is not extracting agent rents from the reinsurance contract by conveying the submission only to broker preferred providers. This also allows the cedent to ensure that assumers preferred by the cedent have the ability to make an offer for the reinsurance of the risk.

The distribution preference field 392 allows the users to select a list of assumers to whom the submission can be conveyed. The distribution preferences field 392 allows the cedent and/or the broker to limit those assumers receiving the submission without requiring that all assumers available will receive the submission. In an alternative embodiment of the present invention, the distribution preference field 392 additionally, or alternatively, allows a user to select those assumers to whom the submission may not be conveyed. Both the required distribution field 390 and the distribution preferences field 392 can be realized in a variety of configurations without departing from the scope or spirit of the present invention. For example, fields 390 and 392 can be configured to comprise interactive links to a listing of reinsurance assumers. Alternatively, the fields can be configured to allow custom input of assumers and assumer information. Additionally, the fields configured to comprise both interactive listings and custom input. By utilizing both the required distribution field 390 and distribution preferences field 392 the present invention allows the cedent and/or the broker unprecedented control over those assumers who will receive the submission for reinsurance of a risk and have the opportunity to provide a response to the submission.

Figure 7:
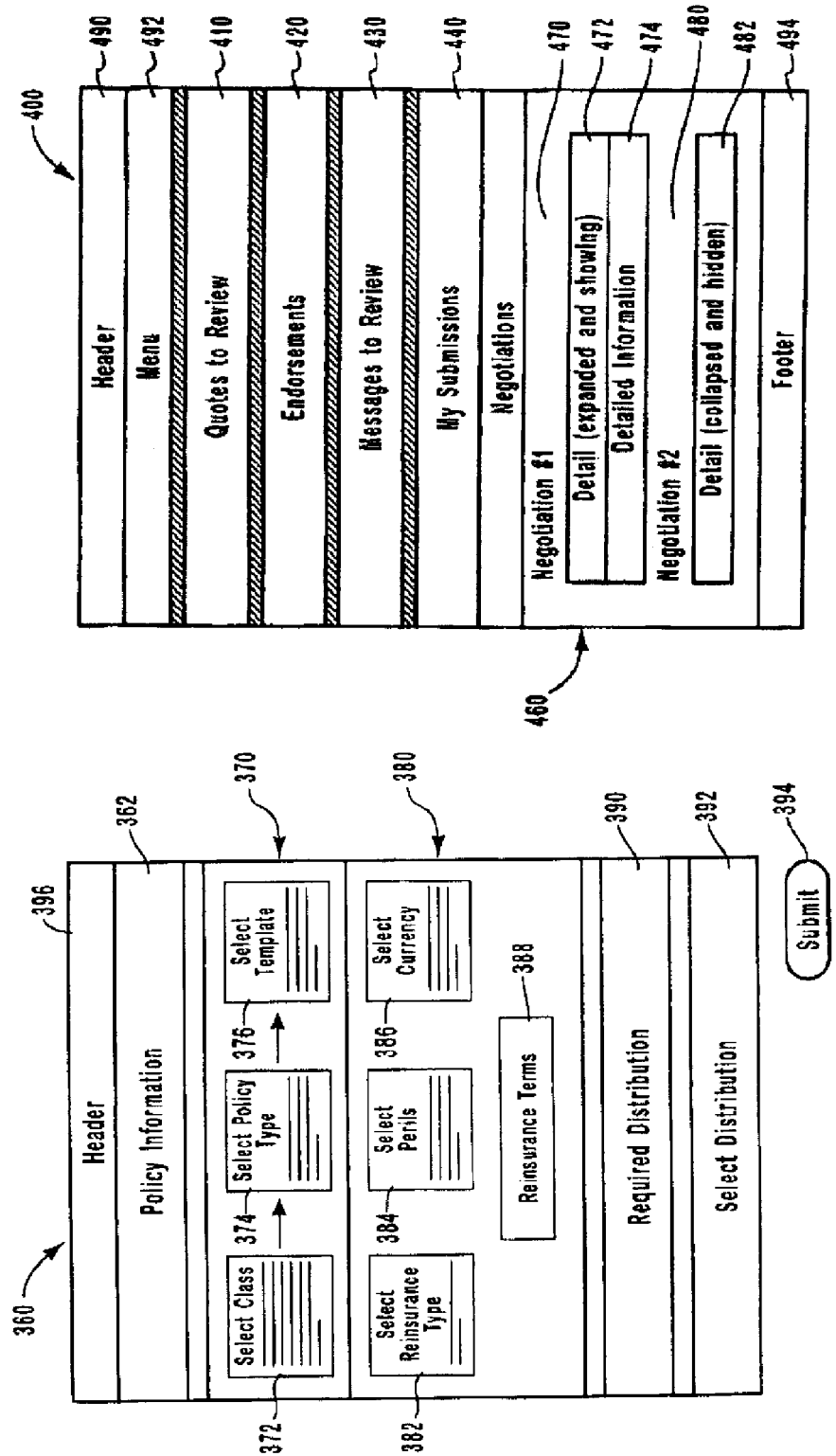
FIG. 7 illustrates a negotiation interface of the present invention for providing access to negotiation related information.

With reference now to FIG. 7 there is shown a negotiation interface 400 of the present invention that is used for facilitating a negotiation. The illustrated embodiment of the negotiation interface is a cedent homepage. Accordingly the fields of the negotiation interface 400 are tailored to assist the cedent and/or broker in viewing negotiation information and allowing the user to continue or conclude the negotiation. It will be appreciated that the negotiation interface 400 can also be configured to comprise an assumer homepage that is tailored to assist the assumer in viewing negotiation information and allowing the assumer to continue or conclude the negotiation. For example, the assumer homepage can include fields for providing responses to submissions and replies received from one or more cedents with whom the assumer is negotiating. Additionally, the assumer homepage can include fields for monitoring various stages of each negotiation for reinsurance of a risk.

FIG. 7 illustrates a negotiation interface 400 comprising a quotes to review field 410, an endorsements field 420, a messages to review field 430, a submissions summary field 440, and a negotiation review field 460. There is also shown an interface header 490 for allowing access to interface related information; a interface menu 492 for allowing access to menu tools associated with the interface; and a interface footer 494 for allowing access to additional information useful for administration of the interface.

The quotes to review field 410 provides cedents and brokers access to quote, offers, and other related assumer responses. By providing access to quotes and offers the quotes review field 410 allows cedents and brokers to quickly identify offers and quotes that have been received but have not been reviewed by the cedent or broker. Accordingly the user can quickly and efficiently identify new quotes received for submissions previously posted.

The endorsements field 420 provides cedents and brokers access to endorsements received from the assumer that are in negotiation by the cedent or broker. As previously discussed an endorsement is a request for an alteration of the terms agreed upon by the parties during the negotiation. By providing access to all endorsements in negotiation, the endorsement field 420 allows users to quickly and efficiently identify all endorsements that are part of the ongoing negotiation without having to review each negotiation.

The messages to review field 430 provides access to custom messages sent in the context of reinsurance negotiations. Much like fields 410 and 420, the messages to review field 430 allows users to identify messages sent from assumers without requiring the user to review each negotiation to determine whether n endorsement has been submitted. The submissions summary field 440 provides access to information related to each submission. In one embodiment, submissions summary field 440 is an interactive link that provides access to a submission detail interface that has all of the detailed information relating to each submission.

The negotiation review field 460 provides negotiation related information for each submission negotiation. The negotiation review field comprises a first submission summary field 470 and a second submission negotiation summary field 480. The first submission summary field 470 provides summary negotiation information for a first submission. The first submission summary field includes a negotiation information window 472. The negotiation information window 472 includes negotiation information 474. In the illustrated embodiment, the negotiation information window 472 is a interactive window and allowing either summary or detailed access to negotiation information 474. By clicking on the negotiation information window, negotiation information 474 is provided to the user in a more detailed format. In one embodiment of the present invention, the negotiation information 474 comprises detailed listings of new negotiation information. In the embodiment, the detailed listings provide a hyperlink to a negotiation page displaying the actual responses and/or replies corresponding to the detailed listings.

The second submission negotiation summary field 480 provides identical functionality to the first negotiation summary field 470 for a second submission negotiation. In one embodiment of the present invention, fields 470 and 480 provide access to first and second negotiations for a single submission. In an alternative embodiment, fields 470 and 480 provide access to all negotiations for first and second submissions. In the preferred embodiment of the present invention, the negotiation review field 460 can be tailored according to the number of submissions and negotiations to provide the most convenient access to all negotiations for each submission for a given cedent. While the illustrated embodiment shows first and second negotiation information windows, a variety of numbers and configurations of negotiation information windows are possible within the scope of the present invention. As will be understood by those skilled in the art, the fields discussed with reference to the negotiation interface 400 are included for illustrative purposes and are not to be considered limiting in any sense. The negotiation interface 400 can be configured with a variety of fields that can be arranged in a variety of configurations for allowing the user to access negotiation information without departing from the scope or spirit of the present invention.

Figure 8:
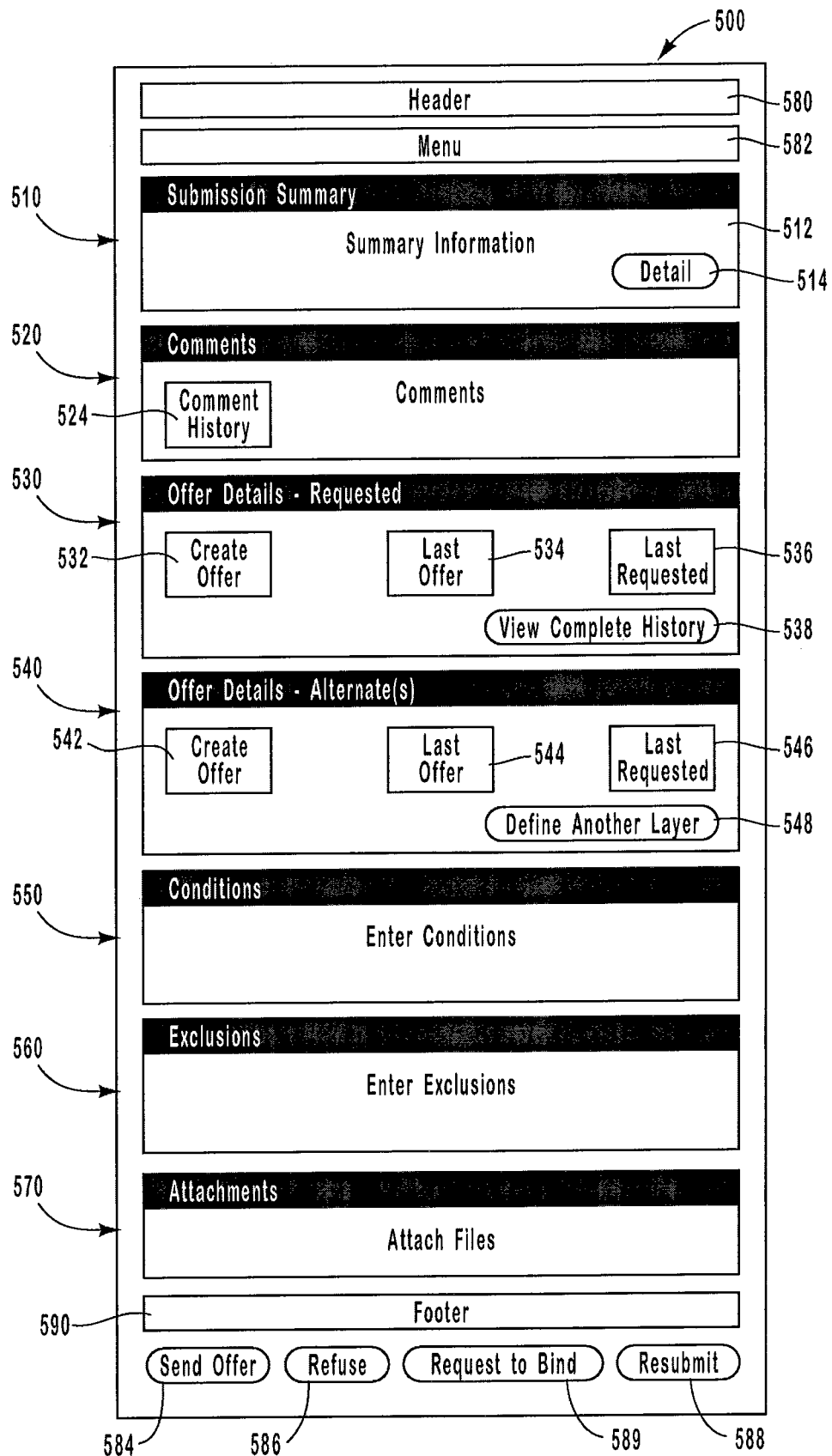
FIG. 8 illustrates a negotiation detail interface for facilitating reinsurance negotiations by allowing users to access negotiation information and by further allowing users to submit replies and responses to continue or conclude the negotiation.

With reference now to FIG. 8 there is shown a negotiation detail interface 500. The negotiation detail interface facilitates reinsurance negotiations by allowing users to access submissions, replies, and responses for any stage of the negotiation and by further allowing users to input replies and responses to continue or conclude the negotiation. The negotiation interface 500 comprises windows 510, 520, 530, 540, 550, 560, and 570 for viewing submissions, replies, and responses and for inputting additional replies and responses. The negotiation interface also comprises buttons 584, 586, 588, and 589 for submitting replies and responses.

The windows of the negotiation interface 500 include a submission information window 510, a comment field 520, a negotiation detail window 530, a negotiation alternates window 540, a conditions window 550, a exclusions window 560, and an attach files window 570. The submission information window 510 provides interactive access to submission information. The submission window 510 comprises a submission summary window 512 and a submission detail button 514. The submission summary window 512 provides summary information for identifying key submission information. The submission detail button 514 provides access to detailed submission information such as policy information and reinsurance information. The detailed submission information can be presented to users in a variety of formats such as in a pop up screen or by through a separate submission detail interface.

The negotiation comment field 520 provides access to comments included as part of submissions, responses, and replies as well as permits users to enter additional comments. By providing access to the comments in a dedicated window, the present invention enables users to quickly and efficiently determine whether new comments have been received. The users are thus able to review the comments without having to review the entire negotiation to determine whether any comments have been sent. The negotiation comment field 520 comprises a field for allowing users to view comments and input of new comments and includes a comment history button 524. The new comment field 520 allows users to view new comments received as part of a response or reply from other parties in the negotiation. The comment field 520 also allows users to input comments in conjunction with a response or reply to be submitted to another party in the negotiation. The comment history button 524 allows users to access all comments provided during various stages of the negotiation. The enter comments field 520 can also be configured to stamp comments with the time, date, and identification information of the person making comments.

The negotiation detail field 530 allows users to view submissions, responses, and replies and the corresponding information exchanged during various stages of the negotiation. The negotiation detail field 530 further allows users and to provide a response or reply to continue or conclude the negotiation. The negotiation detail field 530 include a provide input field 532, a last response field 534, a last submission/reply field 536, and a view complete history button 538. The provide input field 532 allows users to input a reply or response to continue or conclude the negotiation. The last response field 534 allows users to view the last response given by an assumer. The last submission/reply field 536 allows the users to view the last input received from a cedent whether the input was a submission or a reply. The view complete history button 538 allows the user to view each submission, reply, or response exchanged during each stage of the negotiation.

The negotiation alternates window 540 allows users to view alternate offers received as part of a response, reply, or submission. Reinsurance negotiations often include alternative terms by which a risk may be reinsured. Such alternative terms can relate, for example, to price, duration, liability limits, or any term for which reinsurance negotiation risks are conducted. For example, an assumer may offer a higher liability coverage to cover a greater portion of the risk with a high price and an alternative lower liability coverage for a smaller portion of the risk with a lower price in a single offer. The negotiation alternates window 540 allows the users to view both alternatives.

The negotiation alternates window 540 comprises a provide input to alternatives button 542, a last response alternatives button 544, a last submission/reply alternative button 546, and a define another layer button 548. The provide input to alternatives button 542 allows a user to input alternatives as part of a reply or submission to be conveyed to the other party to the negotiation. The last response alternatives button 544 allows the user to view alternatives associated with the last response provided by the assumer. The last submission/reply alternatives button 546 allows the users to view the alternatives associated with the last submission/reply provided by the cedent. The define another layer button 548 allows users to create additional alternative layers associated with layers presently being input or viewed.

The conditions field 550 allows users to enter custom conditions to be included as part of a response or reply. The exclusions field 560 allows users to enter custom exclusions to be included as part of a response or reply. The attach files field 570 allows users to attach files requested as part of additional information request by an assumer or for any other purpose where attaching a file to a response or a reply might be useful.

Buttons for submitting replies and responses comprise a submit counteroffer button 584, a refuse quote/offer button 586, a resubmit submission button 588, and a request to bind/acceptance button 589. The buttons 584, 586, 588, and 589 allow the users to submit a reply or a response with its associated intent. The submit counteroffer button 584 allows a user to submit a counteroffer to the other party to the negotiation. The refuse quote/offer button 586 allows the parties to convey a refusal a quote, offer, counteroffer, endorsement, or other related reply or response. The resubmit submission button 588 allows a cedent to resubmit a revise or unrevised version of a previous submission to one or more assumers. A request to bind/acceptance button 589 allows parties to convey an acceptance of a quote, offer, counteroffer, endorsement, or other related reply or response from the other party to the negotiation.

The fields, windows, buttons, and the associated functionality of the negotiation interface 500 discussed with reference to FIG. 8 are illustrative and in no sense are to be considered limiting in scope. A variety of fields, windows, buttons and associated functionality are possible without departing from the scope or spirit of the present invention. For example, the negotiation interface can include functionality requiring the cedent to take action with respect to a group of responses before allowing action to be taken with a given response (i.e. requiring a cedent to decline all outstanding offers before binding a risk.) The negotiation interface can also include functionality allowing the user to maintain a file for holding a cedent's unassumed submissions and assumed reinsurance risks. The file can permit the cedent to access information related to the unassumed submissions and the assumed reinsurance risks.

Also illustrated in FIG. 8 are a negotiation detail header 580, a negotiation detail menu 582, and a negotiation footer 590. The negotiation detail header 580 provides access to negotiation header administrative information. The negotiation detail menu 582 allows access to tools providing additional negotiation functionality to facilitate reinsurance negotiations. The negotiation footer 590 provides additional administrative information to assist in the processing of negotiation submissions, response, and replies.

In the illustrated embodiment of the present invention the submission negotiation detail interface 500 provide access to a single negotiation for a single submission. In an alternative embodiment of the present invention the negotiation detail interface 500 provide access to two or more negotiations for a single submission. In yet another embodiment of the present invention the negotiation interface provides access to all negotiations for each submission for a given cedent, broker, or assumer.

As will be understood by those skilled in the art, the interfaces illustrated in FIG. 6, FIG. 7, and FIG. 8 are included for illustrative purposes. Additional interfaces can be used to facilitate access to negotiation information and to facilitate the input and conveyance of negotiation information within the scope and spirit of the present invention.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 9:
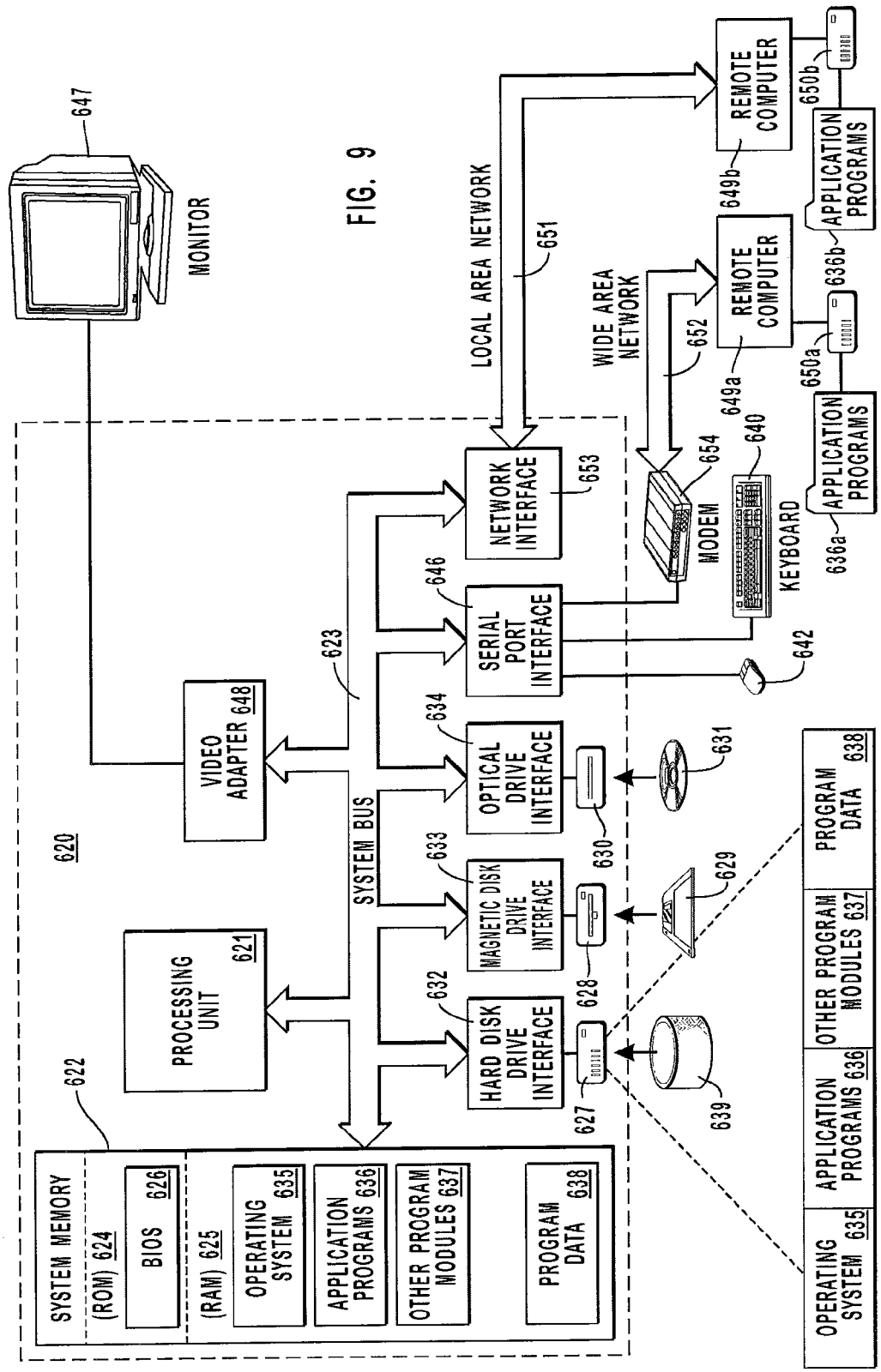
FIG. 9 illustrates an exemplary system that provides a suitable operating environment for the present invention.
Figure 4:
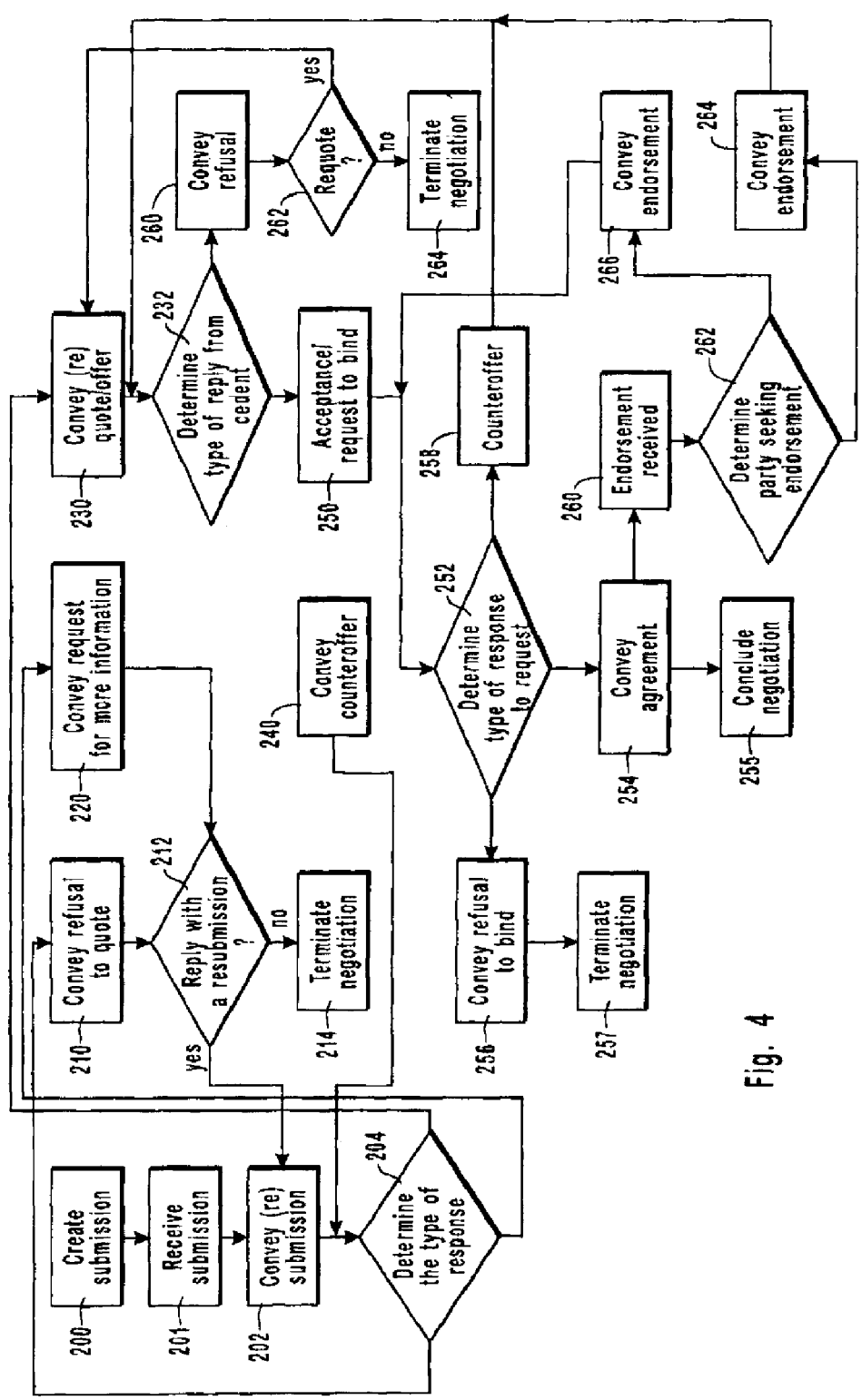
Figure 5:
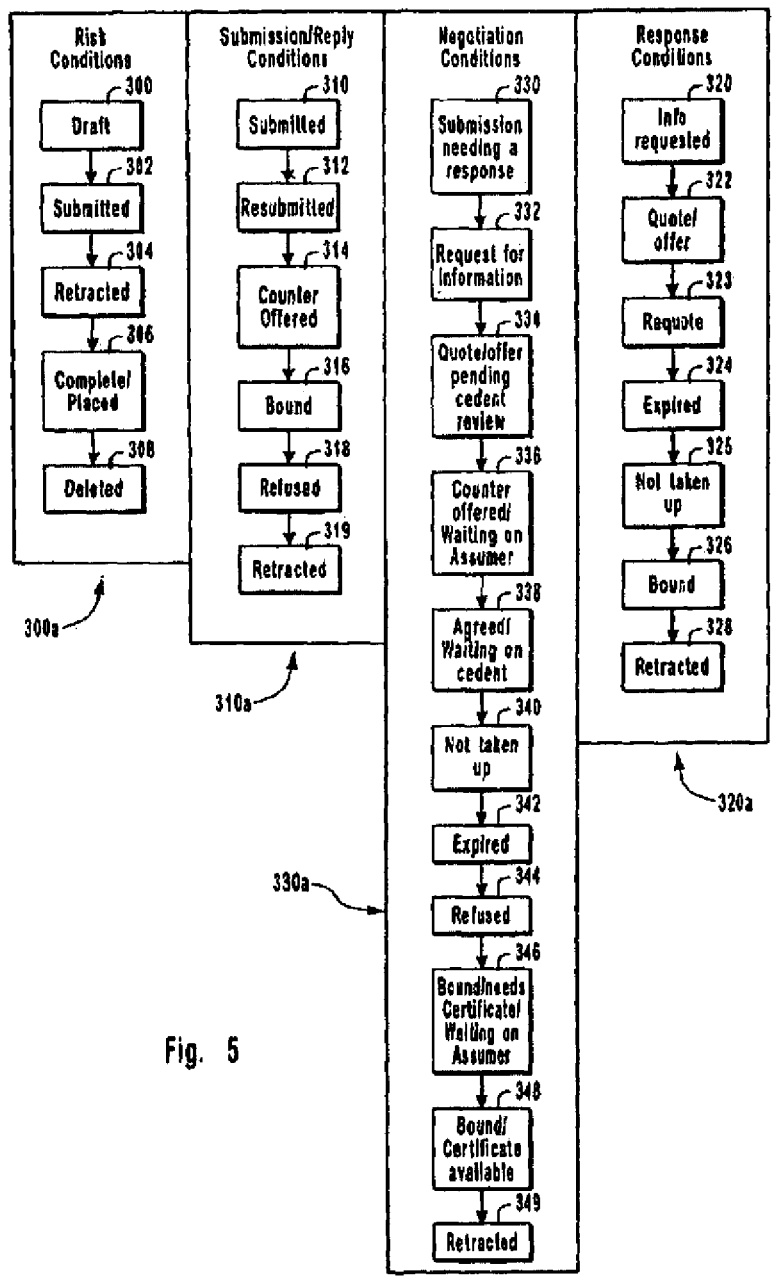

FIG. 9 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 9, an exemplary system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic reply/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disk drive 630 for reading from or writing to removable optical disk 631 such as a CD-ROM or other optical media. The magnetic hard disk drive 627, magnetic disk drive 628, and optical disk drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 639, magnetic disk 629, optical disk 631, ROM 24 or RAM 25, including an operating system 635, one or more application programs 636, other program modules 637, and program data 638. A user may enter commands and information into the computer 620 through keyboard 640, pointing device 642, or other reply devices (not shown), such as a microphone, joy stick, game pad, satellite dish, scanner, or the like. These and other reply devices are often connected to the processing unit 621 through a serial port interface 646 coupled to system bus 623. Alternatively, the reply devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649*a* and 649*b*. Remote computers 649*a* and 649*b* may each be another personal computer, a server, a router, a network PC, a peer device or other common network node, and typically include many or all of the elements described above relative to the computer 620, although only memory storage devices 650*a* and 50*b* and their associated application programs 636*a* and 636*b* have been illustrated in FIG. 1. The logical connections depicted in FIG. 1 include a local area network (LAN) 651 and a wide area network (WAN) 657 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 659, a wireless link, or other means for establishing communications over the wide area network 657, such as the Internet. The modem 659, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 657 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for enabling a cedent associated computing system, comprising a cedent computing system or a cedent's broker computing system, to negotiate a reinsurance of a risk with a plurality of assumers through a host computing system, which is connected to the cedent associated computing system through the Internet or another computing network, wherein the negotiation for reinsurance of the risk is conducted through various stages of negotiation between the cedent associated computing system and the plurality of assumers, the method comprising:

the cedent associated computing system creating a submission of risk for reinsurance with one or more interfaces provided by the host computing system, the submission of risk for reinsurance including a risk record describing an initial insurance of a risk for which reinsurance is being sought and information relating to a type of reinsurance being sought by a cedent;

the cedent associated computing system identifying, through the one or more interfaces provided by the host computing system, a plurality of assumers that are each intended to receive the submission of risk for reinsurance;

the cedent associated computing system providing input to the host computing system, through the one or more interfaces provided by the host computing system, which causes the submission of risk for reinsurance to be sent from the host computing system to each of the plurality of assumers, and such that each of the plurality of assumers receives the same submission of risk for reinsurance that was created by the cedent associated computing system with the one or more interfaces provided by the host computing system;

the cedent associated computing system receiving, through the one or more interfaces provided by the host computing system one or more responses to the submission of risk for reinsurance from one or more of the plurality of assurners to whom the submission of risk for reinsurance was conveyed, the received responses indicative of one or more of the plurality of assumers that are interested in negotiating for reinsurance of the risk, wherein each response comprises one of an offer, a counteroffer, a quote, a plurality of alternative quotes, a refusal to quote, or an acceptance of a request to bind;

the cedent associated computing system accessing at least one negotiation interface from the one or more interfaces provided by the host computing system and which includes interface response options for the cedent associated computing system to reply to a corresponding assumer of each received response, the interface response options comprising at least one of a counter offer option, a refuse offer option, or an accept offer option, wherein when the cedent associated computing system utilizes the counter offer option, the refuse offer option, or the accept option for replying to a received response from a corresponding assumer, the host system conveys a corresponding counter offer, refusal or acceptance to the corresponding assumer;

the cedent associated computing system utilizing the at least one negotiation interface to reply to at least one received response from at least one corresponding assumer of the plurality of assumers; and the cedent associated computing system accessing the at least one negotiation interface to accesses any additional responses and for submitting additional replies necessary to continue or conclude the negotiation with any of the plurality of assumers.

2. The method recited in claim 1, wherein the cedent associated computing system comprises a computing system of the cedent.

3. The method recited in claim 2, wherein the risk record is constructed with information obtained by the cedent and that is based an association of the cedent with the risk.

4. The method recited in claim 1, wherein the cedent associated computing system comprises a broker computing system that is associated with a cedent.

5. The method recited in claim 1, wherein at least one of the plurality of assumers comprises a broker system associated with an assumer.

6. The method recited in claim 1, wherein the host system is interposed between the cedent associated system and the plurality of assumers.

7. The method recited in claim 1, wherein the distribution list includes a list of assumers that should receive the submission as well as a list of assumers that can optionally receive the submission.

8. The method recited in claim 1, wherein submitting information for reinsurance further comprises an act of classifying policy information of the risk to be reinsured and which further includes:

selecting a policy class;

selecting a policy type from a subset of policy types within the policy class;

selecting a template for inputting policy information, the template tailored to the policy type; and inputting policy information into the selected template.

9. The method recited in claim 1, wherein the act of submitting information for reinsurance of a risk includes inputting underwriting information for the policy for which reinsurance is being sought as well as preferred terms of reinsurance being requested.

10. The method as recited in claim 1, wherein the cedent associated computing system utilizes an API associated with the host system to create the submission of risk, identify of the plurality of assumers, cause the submission of risk to be sent to each of the plurality of assumers and to submit the at least one negotiation reply.

11. The method as recited in claim 1, wherein the cedent associated computing system includes a computing system having a processor and stored computer executable instructions which when executed by the cedent associated system enable the cedent associated system to implement the method.

12. The method as recited in claim 1, wherein the at least one negotiation reply comprises a counteroffer that is responsive to the assumer response, and wherein the method further includes the cedent associated computing system receiving at least one counteroffer from the one or more of the plurality of assumers and that is responsive to the cedent counteroffer.

13. A computer program product comprising one or more computer-readable storage media having stored computer-executable instructions for implementing the method comprising:

the cedent associated computing system creating a submission of risk for reinsurance with one or more interfaces provided by the host computing system, the submission of risk for reinsurance including a risk record describing an initial insurance of a risk for which reinsurance is being sought and information relating to a type of reinsurance being sought by a cedent;

the cedent associated computing system identifying, through the one or more interfaces provided by the host computing system, a plurality of assumers that are each intended to receive the submission of risk for reinsurance;

the cedent associated computing system providing input to the host computing system, through the one or more interfaces provided by the host computing system, which causes the submission of risk for reinsurance to be sent from the host computing system to each of the plurality of assumers, and such that each of the plurality of assumers receives the same submission of risk for reinsurance that was created by the cedent associated computing system with the one or more interfaces provided by the host computing system;

the cedent associated computing system receiving, through the one or more interfaces provided by the host computing system one or more responses to the submission of risk for reinsurance from one or more of the plurality of assumers to whom the submission of risk for reinsurance was conveyed, the received responses indicative of one or more of the plurality of assumers that are interested in negotiating for reinsurance of the risk, wherein each response comprises one of an offer, a counteroffer, a quote, a plurality of alternative quotes, a refusal to quote, or an acceptance of a request to bind;

the cedent associated computing system accessing at least one negotiation interface from the one or more interfaces provided by the host computing system and which includes interface response options for the cedent associated computing system to reply to a corresponding assumer of each received response, the interface response options comprising at least one of a counter offer option, a refuse offer option, or an accept offer option, wherein when the cedent associated computing system utilizes the counter offer option, the refuse offer option, or the accept option for replying to a received response from a corresponding assumer, the host system conveys a corresponding counter offer, refusal or acceptance to the corresponding assumer;

the cedent associated computing system utilizing the at least one negotiation interface to reply to at least one received response from at least one corresponding assumer of the plurality of assumers; and the cedent associated computing system accessing the at least one negotiation interface to accesses any additional responses and for submitting additional replies necessary to continue or conclude the negotiation with any of the plurality of assumers.

14. The computer program product recited in claim 13, wherein the computer program product comprises a computing system and wherein the computer-readable storage media comprises system memory of the computing system.

15. A method for enabling an assumer associated computing system, comprising an assumer computing system or an assumer's broker computing system, to negotiate a reinsurance of a risk with a cedent through a host computing system, which is connected to the assumer associated computing system through a network comprising the Internet or another computing network, wherein the negotiation for reinsurance of the risk is conducted through various stages of negotiation, the negotiation for reinsurance and method comprising:

the assumer associated computing system receiving a submission of risk for reinsurance from the host system, wherein the submission is received by the assumer associated computing system over the network, as well as by at least one other assumer computing system associated with a plurality of different assumers identified by the cedent when the cedent created the submission of risk for reinsurance through one or more interfaces provided by the host system, the submission of risk for reinsurance including a risk record describing an initial insurance of a risk for which reinsurance is being sought and information relating to a type of reinsurance being sought by the cedent;

the assumer associated computing system utilizing the one or more interfaces provided by the host system to create an assumer offer to the cedent in response to the submission of the risk for reinsurance, the assumer offer providing terms for which reinsurance will be provided to the cedent and corresponding to the submission of risk for reinsurance, wherein the assumer offer is sent to the cedent by the host system;

the assumer associated computing system receiving a cedent counteroffer from the host system corresponding to the submission of risk for reinsurance and which was submitted by the cedent through the one or more interfaces provided by the host system and which is responsive to the assumer offer;

the assumer associated computing system utilizing the one or more interfaces provided by the host system to create at least one assumer counteroffer which is transmitted to the cedent by the host system and which is responsive to the cedent counteroffer;

the assumer associated computing system receiving at least one cedent negotiation reply from the host system, which was submitted by the cedent through the one or more interfaces provided by the host system and which is responsive to the assumer counteroffer and which includes either a cedent acceptance of terms in the assumer counteroffer or, alternatively, a new cedent counteroffer that is indicative of a cedent interest in further negotiating with the assumer associated system for the reinsurance, wherein the one or more interfaces include at least one negotiation interface which includes interface options for the cedent to submit replies through the host system to the assumer associated computing system, the interface response options comprising a counter offer option, a refuse offer option, and an accept offer option, wherein when the cedent utilizes the counter offer option, the refuse offer option, or the accept option, the host system conveys corresponding information to the assumer associated computing system; and the assumer associated computing system utilizing the one or more interfaces provided by the host system to create at least one additional assumer counteroffer which is transmitted to the cedent by the host system and which is responsive to the at least one cedent negotiation reply if the cedent negotiation reply comprises the new cedent counteroffer or, alternatively, utilizing the one or more interfaces provided by the host system to enter into an agreement to provide reinsurance to the cedent according to the terms defined by at least the assumer counteroffer if the negotiation reply comprises the cedent acceptance of the terms defined by at least the assumer counteroffer.

16. The method recited in claim 15, wherein the assumer associated computing system comprises a computing system of an assumer.

17. The method recited in claim 15, wherein the assumer associated computing system comprises a computing system of a broker that is associated with an assumer and that is interposed between the assumer and the host system.

18. The method recited in claim 15, wherein the method further includes the assumer associated computing system submitting an endorsement to the cedent to request an alteration of the tenns agreed upon by the parties during the negotiation.

19. The method recited in claim 15, wherein receiving the submission of the reply from the cedent comprises receiving a counteroffer from the cedent.

20. The method recited in claim 15, wherein the method further includes receiving a notification in the form of an email having an embedded URL to a website of the host system and that links to data concerning the negotiation.

21. The method recited in claim 15, wherein the method further includes keeping information regarding the negotiation for reinsurance between the cedent and the assumer away from the at least one other assumer who also received the same cedent submission for the risk of reinsurance that was received by the assumer and such that said at least one other assumer is unaware of details of at least the assumer offer and the cedent counteroffer to the assumer offer.

22. The method as recited in claim 21, wherein the assumer associated computing system is unaware of the at least one other assumer who also received the same cedent submission for risk of reinsurance.

23. A computer program product comprising one or more computer-readable storage media having stored computer-executable instructions for implementing the method comprising:

the assumer associated computing system receiving a submission of risk for reinsurance from the host system, wherein the submission is received by the assumer associated computing system over the network, as well as by at least one other assumer computing system associated with a plurality of different assumers identified by the cedent when the cedent created the submission of risk for reinsurance through one or more interfaces provided by the host system, the submission of risk for reinsurance including a risk record describing an initial insurance of a risk for which reinsurance is being sought and information relating to a type of reinsurance being sought by the cedent;

the assumer associated computing system utilizing the one or more interfaces provided by the host system to create an assumer offer to the cedent in response to the submission of the risk for reinsurance, the assumer offer providing terms for which reinsurance will be provided to the cedent and corresponding to the submission of risk for reinsurance, wherein the assumer offer is sent to the cedent by the host system;

the assumer associated computing system receiving a cedent counteroffer from the host system corresponding to the submission of risk for reinsurance and which was submitted by the cedent through the one or more interfaces provided by the host system and which is responsive to the assumer offer;

the assumer associated computing system utilizing the one or more interfaces provided by the host system to create at least one assumer counteroffer which is transmitted to the cedent by the host system and which is responsive to the cedent counteroffer;

the assumer associated computing system receiving at least one cedent negotiation reply from the host system, which was submitted by the cedent through the one or more interfaces provided by the host system and which is responsive to the assumer counteroffer and which includes either a cedent acceptance of terms in the assumer counteroffer or, alternatively, a new cedent counteroffer that is indicative of a cedent interest in further negotiating with the assumer associated system for the reinsurance. wherein the one or more interfaces include at least one negotiation interface which includes interface options for the cedent to submit replies through the host system to the assumer associated computing system, the interface response options comprising a counter offer option, a refuse offer option, and an accept offer option, wherein when the cedent utilizes the counter offer option, the refuse offer option, or the accept option. the host system conveys corresponding infonnation to the assumer associated computing system; and the assumer associated computing system utilizing the one or more interfaces provided by the host system to create at least one additional assumer counteroffer which is transmitted to the cedent by the host system and which is responsive to the at least one cedent negotiation reply if the cedent negotiation reply comprises the new cedent counteroffer or, alternatively, utilizing the one or more interfaces provided by the host system to enter into an agreement to provide reinsurance to the cedent according to the terms defined by at least the assumer counteroffer if the negotiation reply comprises the cedent acceptance of the terms defined by at least the assumer counteroffer.

24. The computer program product recited in claim 23, wherein the computer program product comprises a computing system and wherein the computer-readable storage media comprises system memory of the computing system.

* * * * *

UNITED STATES PATENT AND TRADEMARK OFFICE
CERTIFICATE OF CORRECTION

PATENT NO.       : 7,565,302 B2
APPLICATION NO.  : 11/939411
DATED            : July 21, 2009
INVENTOR(S)      : Igor Best-Devereux It is certified that error appears in the above-identified patent and that said Letters Patent is hereby corrected as shown below:

The sheets of drawings consisting of figures 4, 5 and 7 should be deleted to appear as per attached figures 4, 5 and 7.

Column 1
Line 16, remove [both]
Line 33, insert --,-- after "negotiation"

Column 2
Line 4, insert --,-- after "Accordingly"

Column 4
Line 57, insert --,-- after "embodiment"
Line 59, insert --,-- after "example"

Column 5
Line 15, insert --,-- after "input"

Column 7
Line 24, insert --,-- after "invention"

Column 9
Line 30, insert --If no requote/reoffer has been received, negotiation is terminated in step 264--

Column 10
Line 9, change "260" to --270--
Line 11, change "262" to --272--
Line 13, change "264" to --274--
Line 54, change "304" to --308--
Line 62, remove [308]
Line 65, change "remsurance" to --reinsurance--
Line 66, change "compuse" to --comprise--

Signed and Sealed this

Second Day of November, 2010

David J. Kappos
*Director of the United States Patent and Trademark Office*

Column 11
Line 14, change "for" to --from--
Line 35, change "subsequently" to --subsequent--

Column 12
Line 33, remove [364,]
Line 43, change "Insurance" to --insurance--

Column 13
Line 36, insert --,-- after "384"

Column 14
Line 56, insert --,-- after "discussed"

Column 15
Line 1, change "n" to --an--
Line 17, change "allowing either summary" to --allows either summarized--
Line 50, insert --,-- after "FIG. 8"

Column 16
Line 8, remove [by]
Line 34, remove [and]
Line 36, change "include" to --includes--

Column 17
Line 24, change "revise" to --revised--
Line 55, insert --,-- after "invention"
Line 56, change "provide" to --provides--
Line 58, insert --,-- after "invention"
Line 59, change "provide" to --provides--
Line 61, insert --,-- after "invention"

Column 19
Line 9, insert --a-- after "writing to"
Line 9, insert --,-- after "631"
Line 26, change "ROM 24 or RAM 25" to --ROM 624 or RAM 625--
Line 49, change "50b" to --650b--
Line 53, change "657" to --652--
Line 61, change "659" to --654--
Line 62, change "657" to --652--
Line 63, change "659" to --654--

Column 21
Line 48, remove [of]

Column 24
Line 11, change "tenns" to --terms--

Column 25
Line 19, change "infonnation" to --information--